Figure 1:
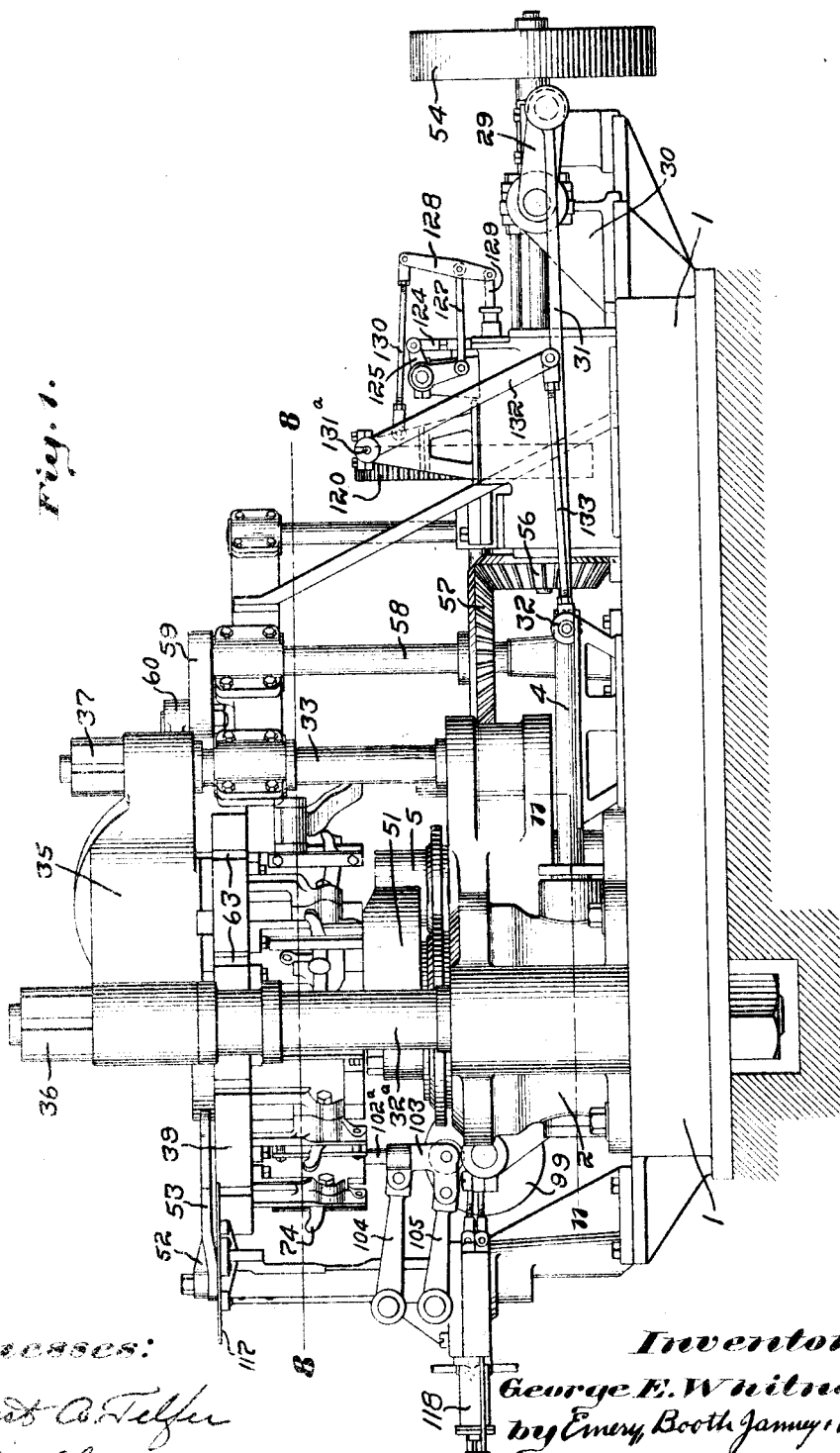

G. E. WHITNEY.
PRESS.
APPLICATION FILED AUG. 18, 1911.

1,174,212.

Patented Mar. 7, 1916.
13 SHEETS—SHEET 1.

Witnesses:
Ernest A. Telfer
Carl L. Choate

Inventor:
George E. Whitney
by Emery, Booth, Janney & Varney,
Att'ys.

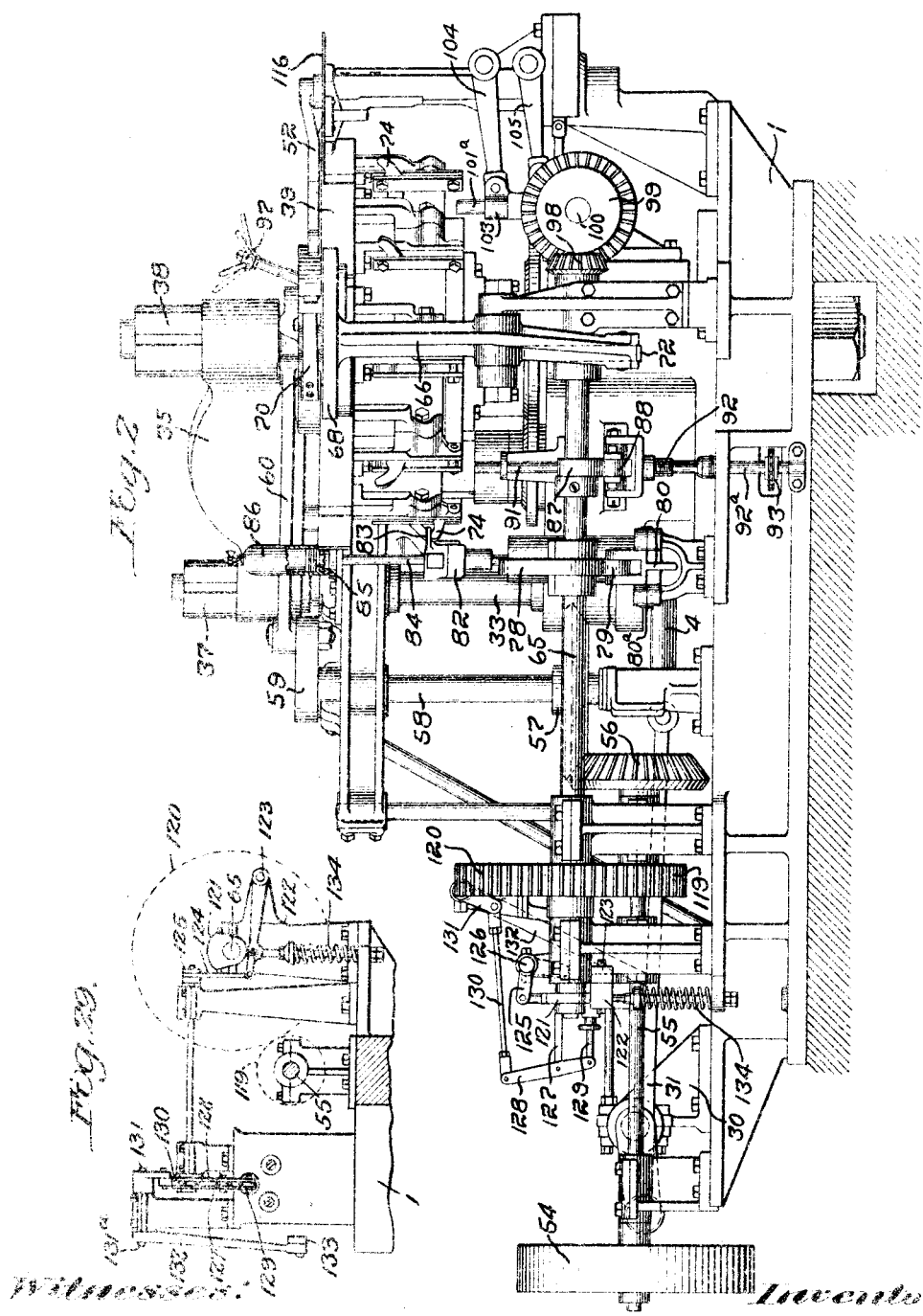

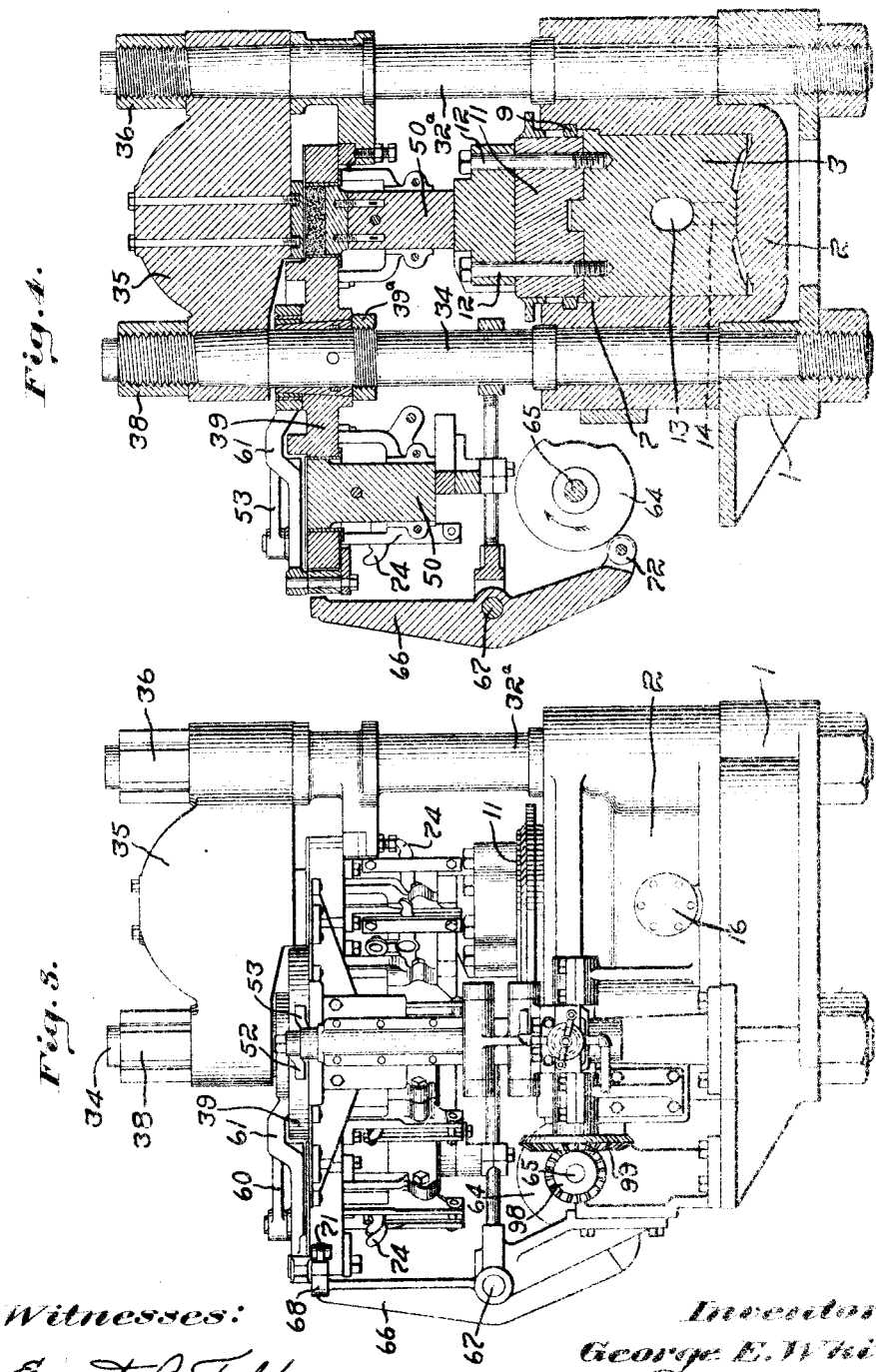

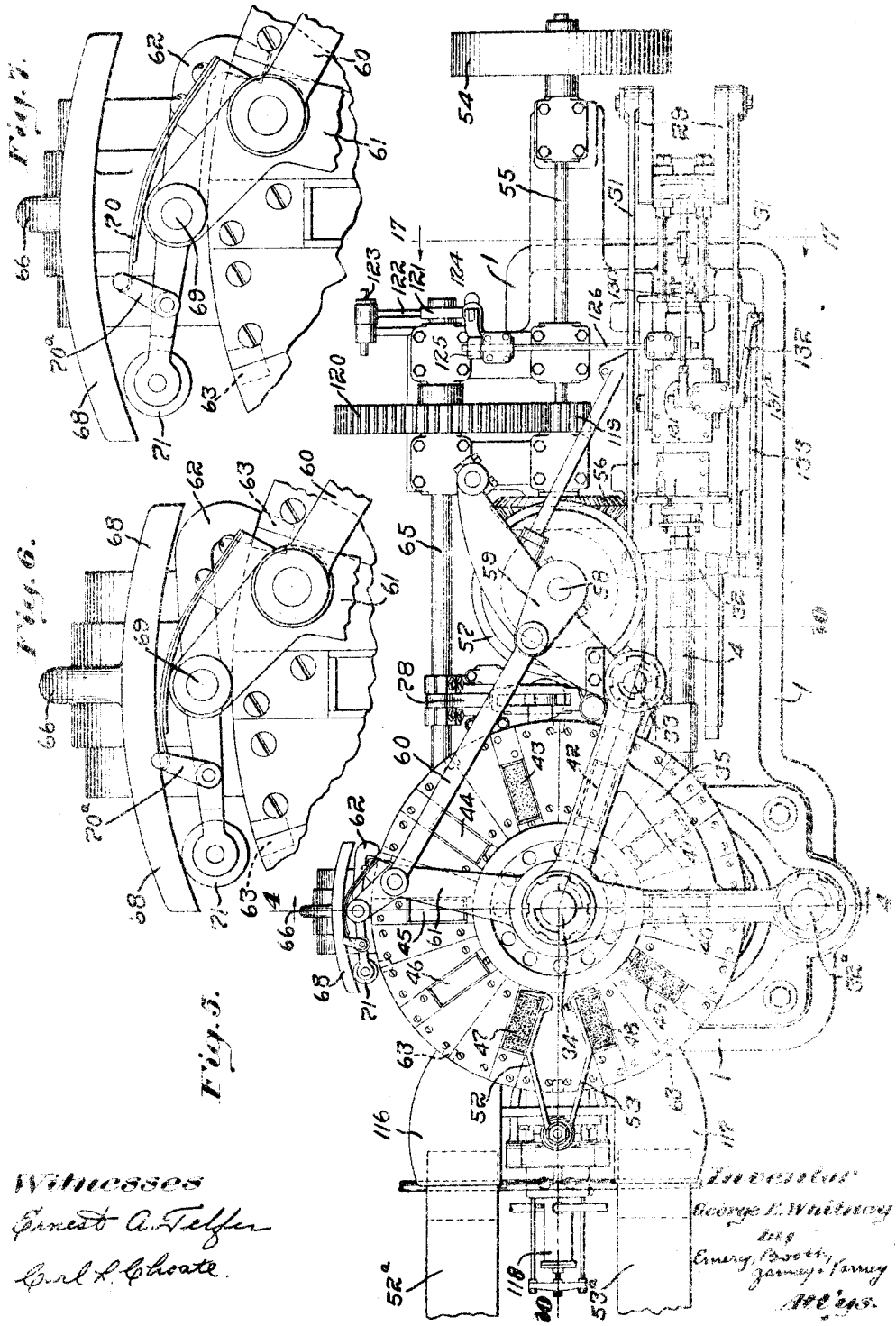

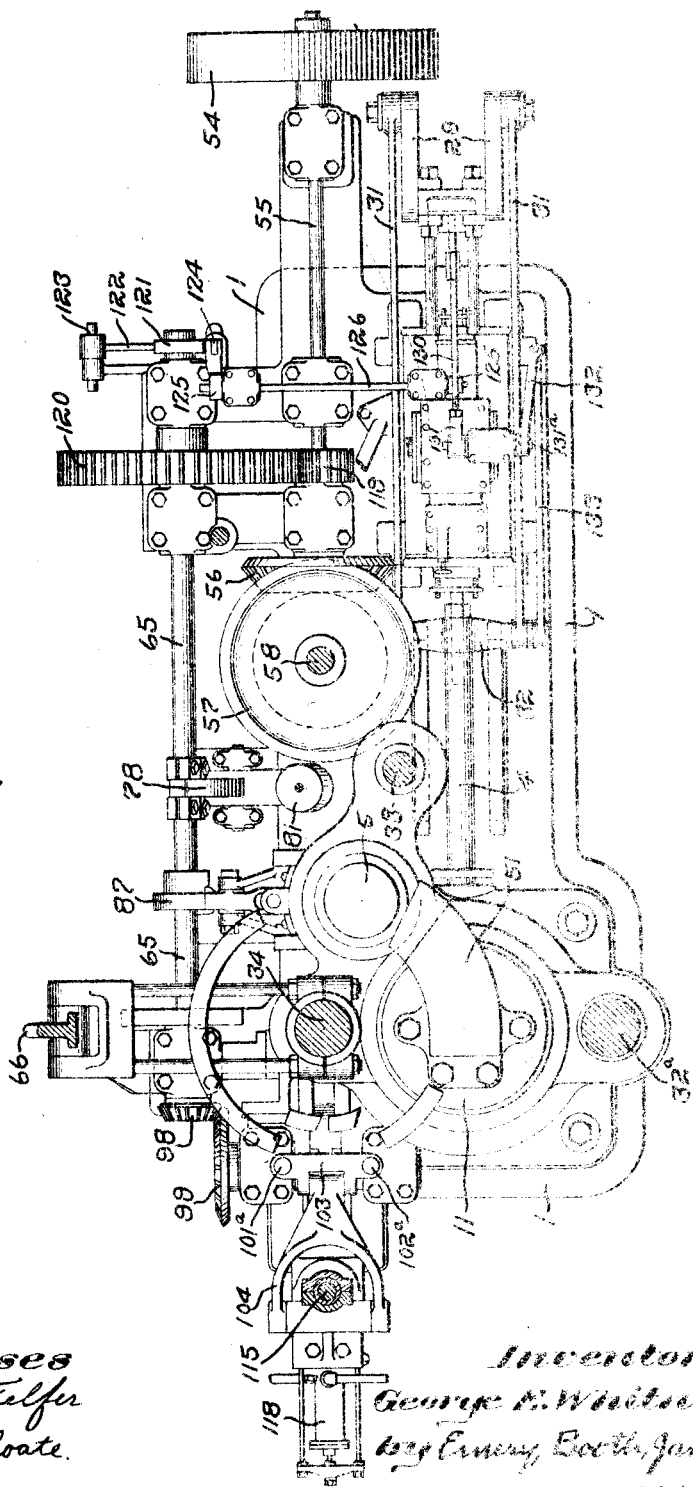

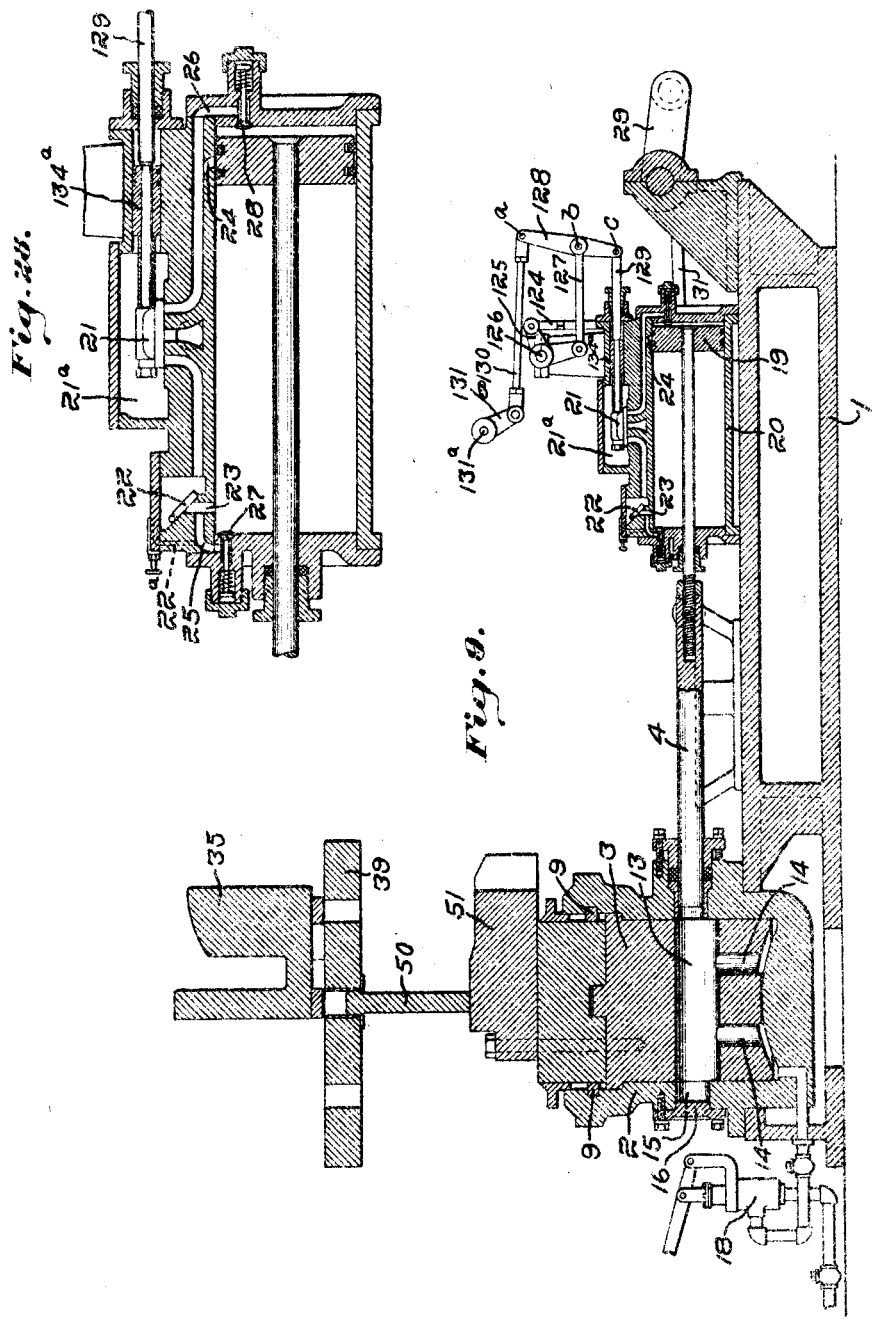

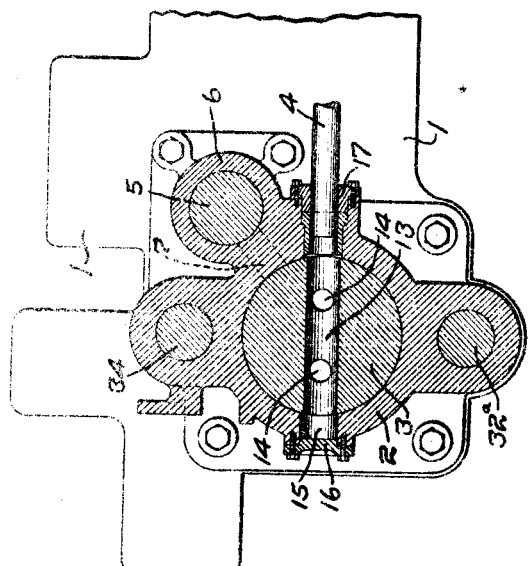
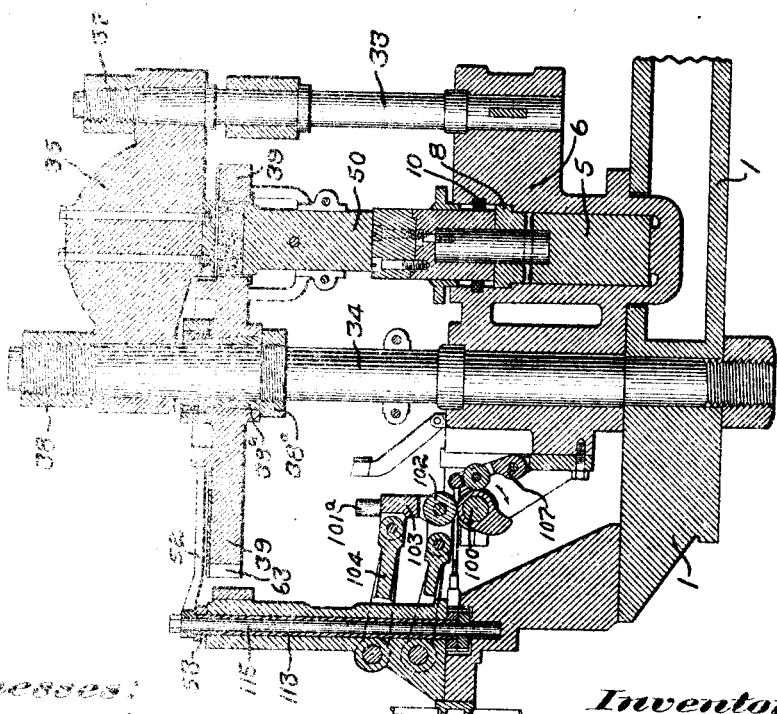

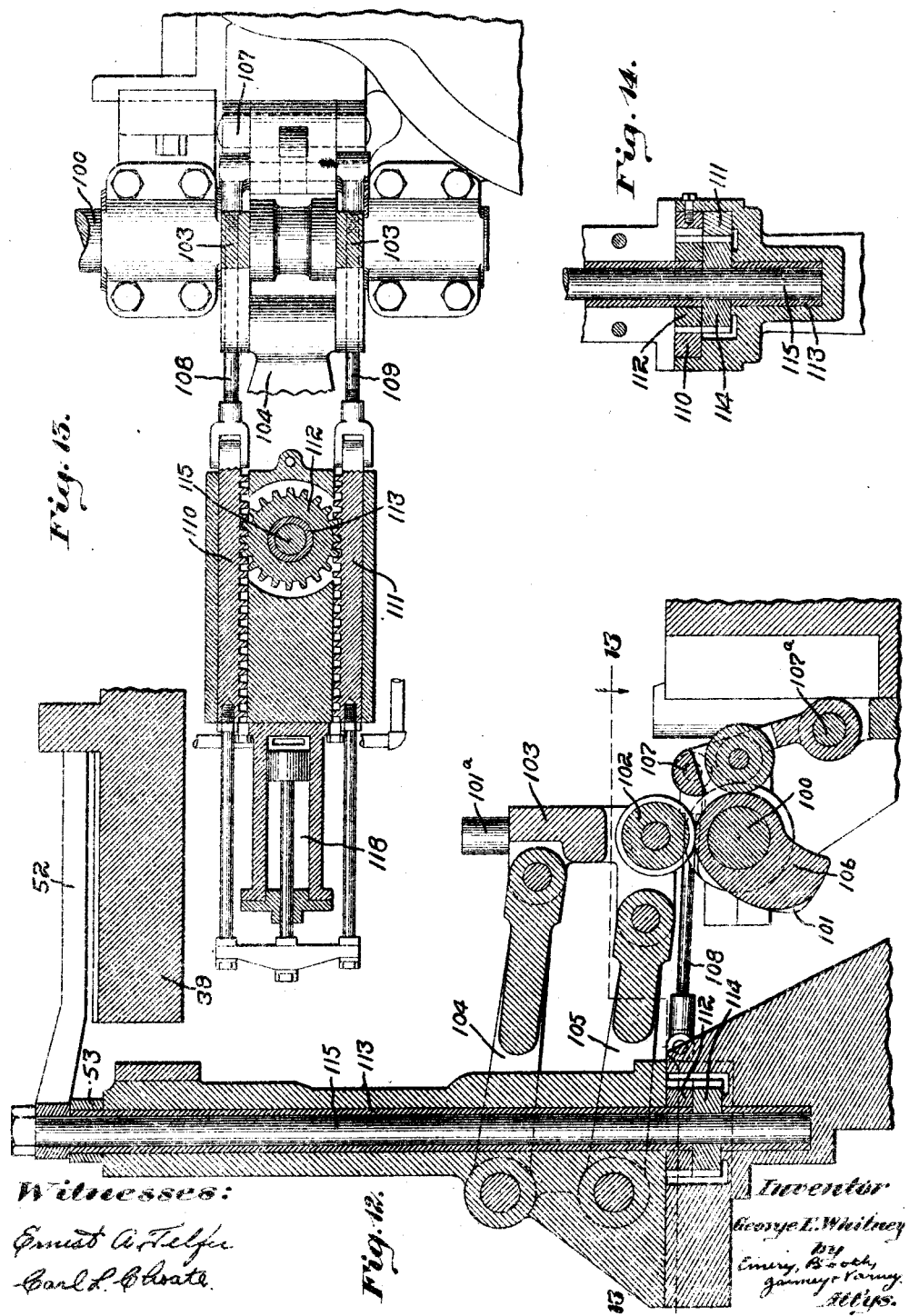

G. E. WHITNEY.
PRESS.
APPLICATION FILED AUG. 18, 1911.
1,174,212.
Patented Mar. 7, 1916.
13 SHEETS—SHEET 9.
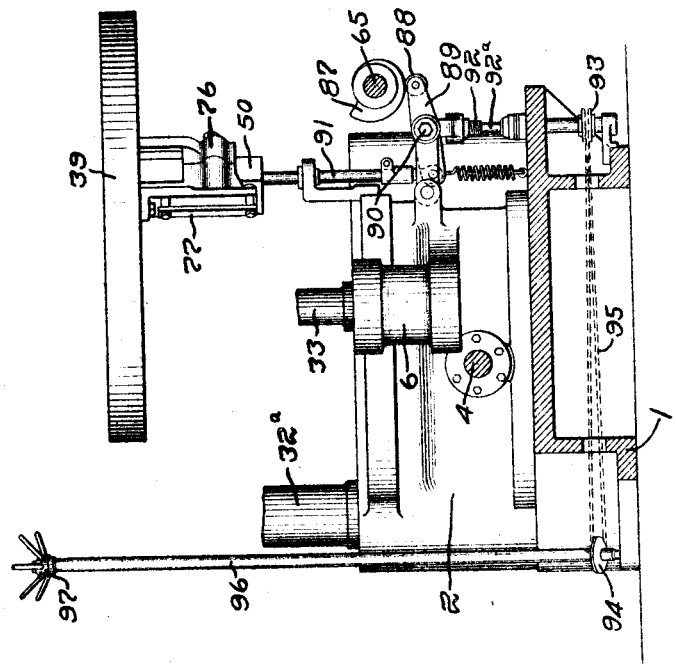
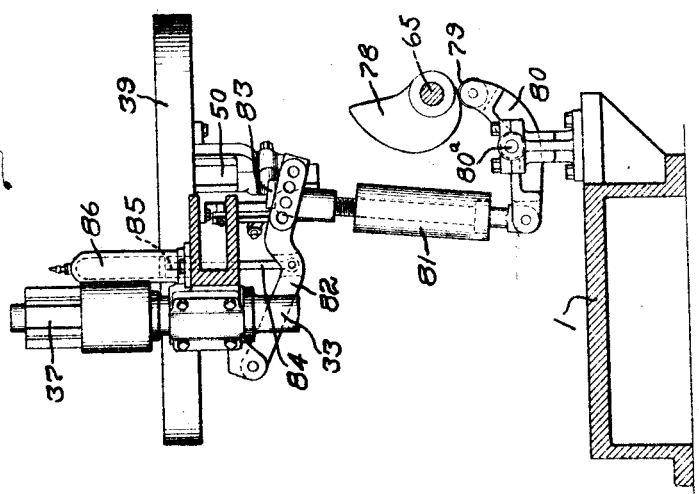
Witnesses:
Ernest A. Telfer
Carl L. Choate.
Inventor:
George E. Whitney
by Emery, Booth, Janney & Varney
Attys.

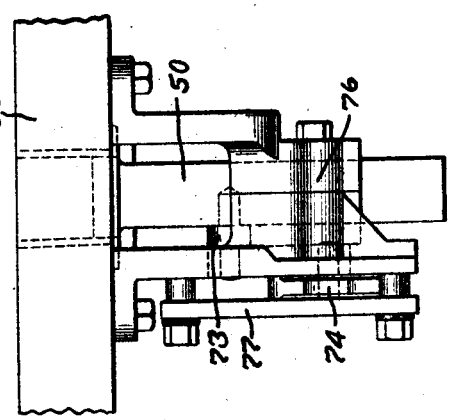
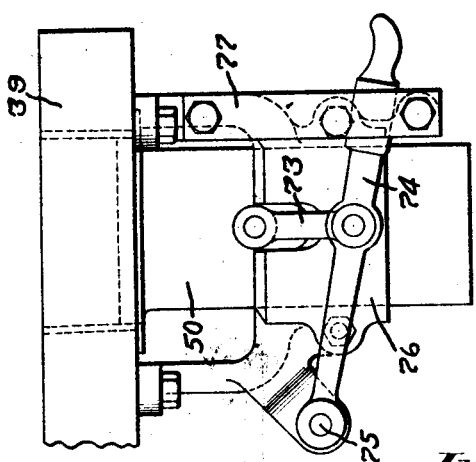

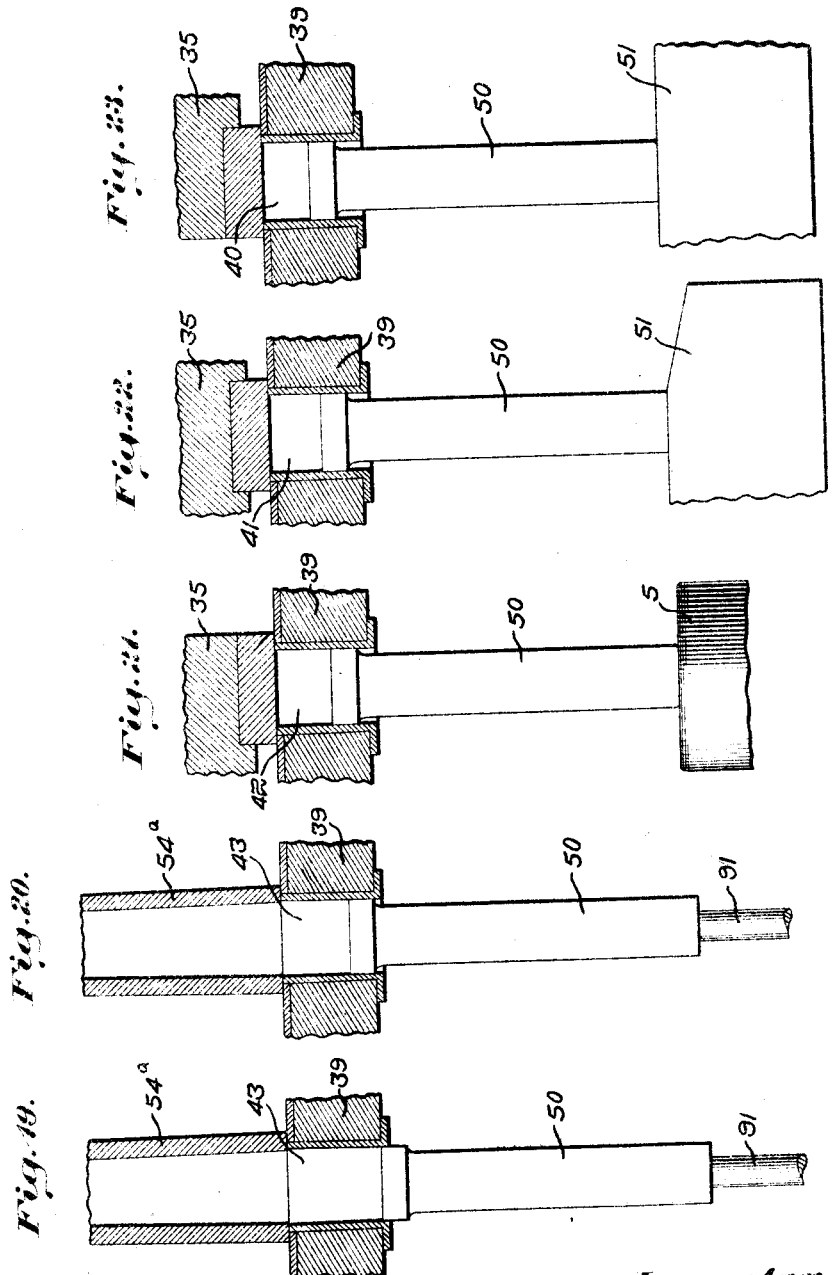

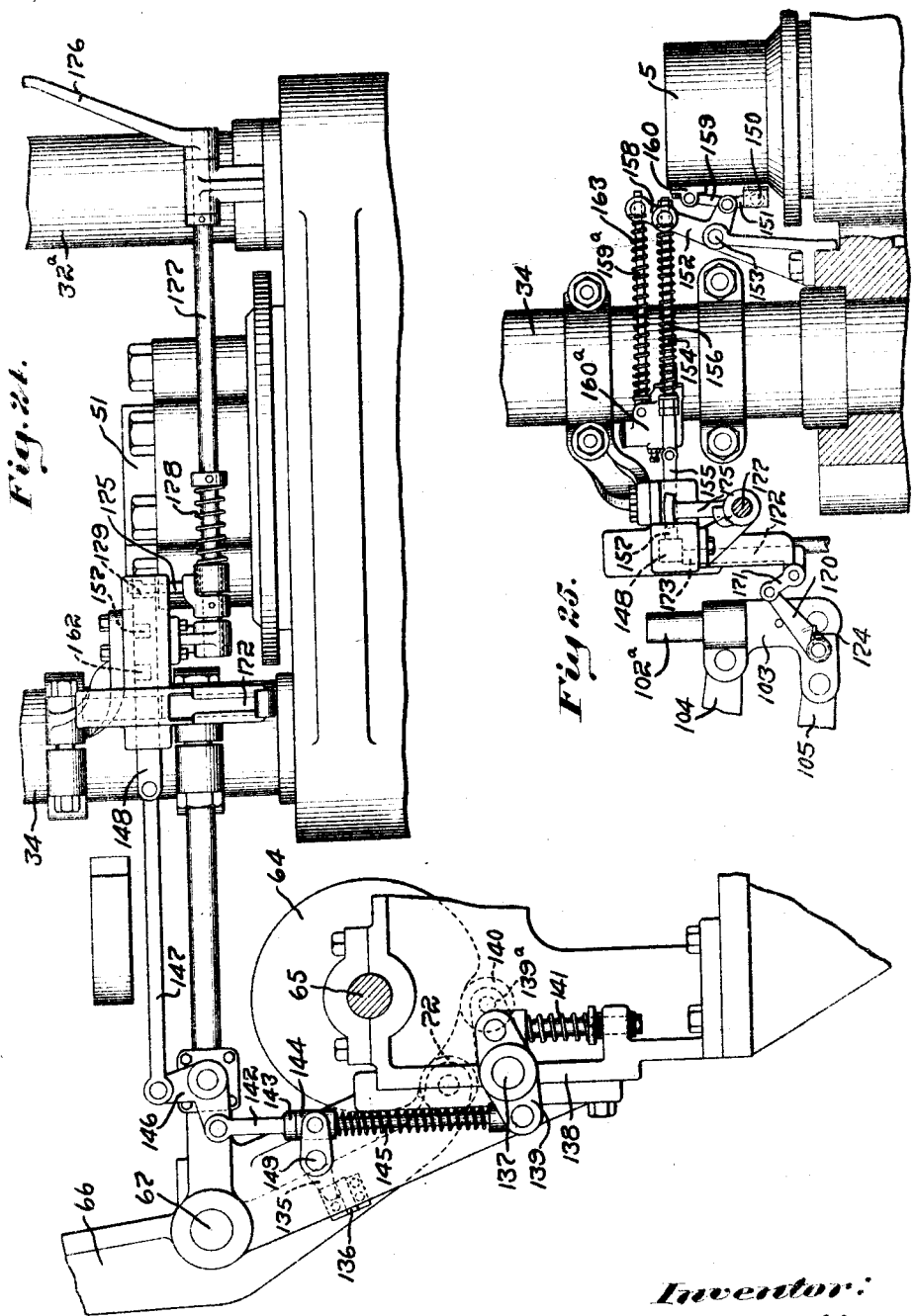

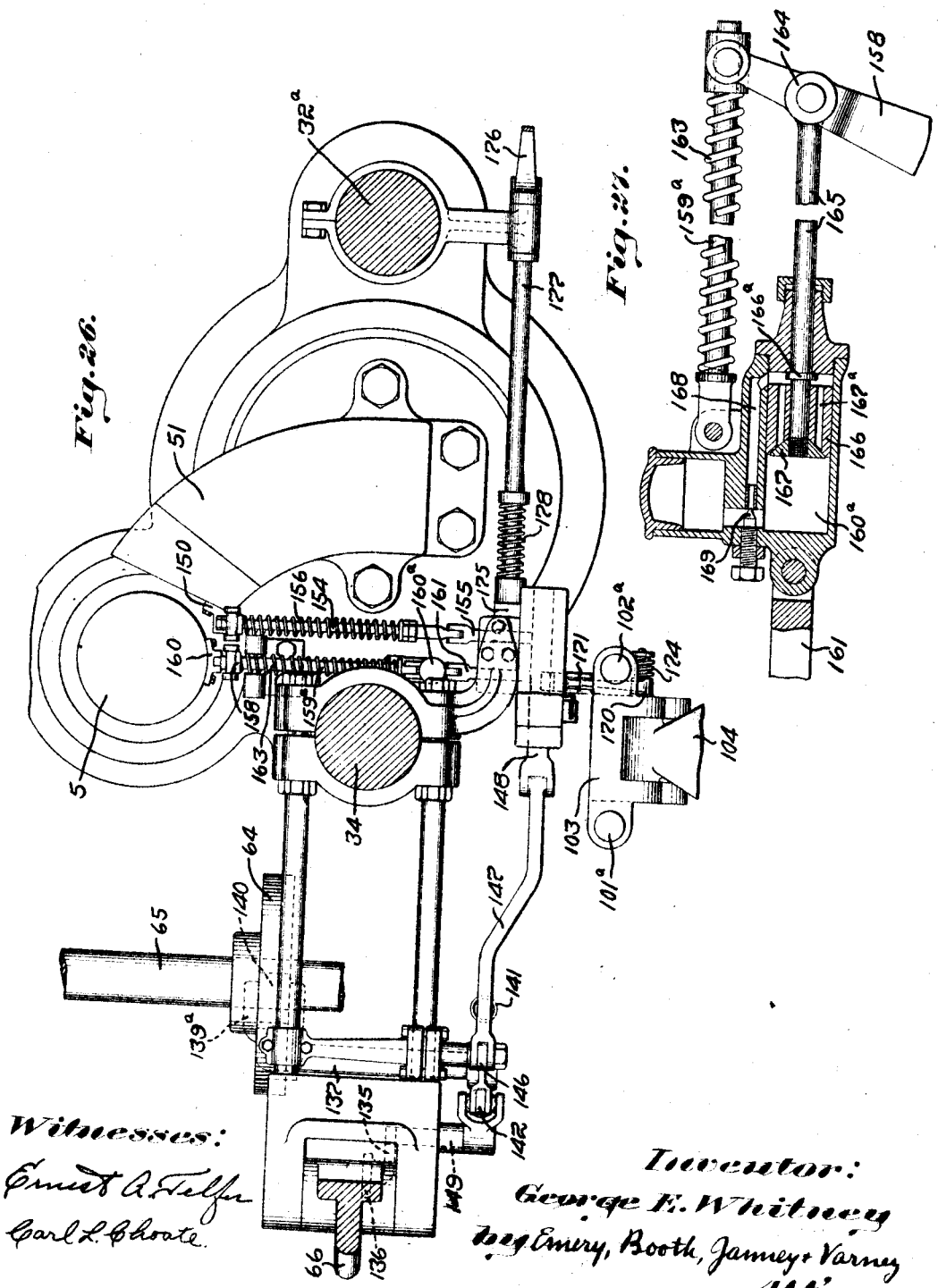

UNITED STATES PATENT OFFICE.

GEORGE ELI WHITNEY, OF YONKERS, NEW YORK, ASSIGNOR TO THE INTERNATIONAL PAVEMENT COMPANY, OF HARTFORD, CONNECTICUT, A CORPORATION OF CONNECTICUT.

PRESS.

1,174,212.     Specification of Letters Patent.     Patented Mar. 7, 1916.

Application filed August 18, 1911. Serial No. 644,735.

*To all whom it may concern:*

Be it known that I, GEORGE ELI WHITNEY, a citizen of the United States, and a resident of Yonkers, in the county of Westchester, State of New York, have invented an Improvement in Presses, of which the following description, in connection with the accompanying drawings, is a specification, like characters on the drawings representing like parts.

This invention relates to certain improvements in the construction and mode of operation of presses employed in the manufacture of blocks, bricks, tiles and the like, made from asphaltic or other plastic mixtures or materials. It is a commercial necessity that these blocks, tiles and the like be compressed not only under high pressure but with great rapidity.

Heretofore presses adapted to compress plastic mixtures or material into blocks, bricks and the like have usually been unsatisfactory in one, the other, or both of these essentials. This arises from two causes. Every automatic block press comprises two main classes of instrumentalities, viz: the compressing instrumentalities and the coöperating material handling instrumentalities for handling the material both before and after compression. If any part of either of these instrumentalities is slow, liable to breakdowns, or otherwise objectionable, it reduces the efficiency of the entire press to the level of the least satisfactory feature.

My invention aims, among other things, to provide a press, preferably hydraulic, which shall be free from speed restrictive features both in its compressing instrumentalities and in its material handling instrumentalities.

It also aims to reduce to a minimum all uncontrolled momentum which might result in breakage in either of the above named instrumentalities.

Another object of my invention is to produce more efficient compression and distribution of the material under compression so that a superior product may be attained.

My invention comprises also certain novel features of construction and operation and certain combinations of parts and operations which will be hereinafter more fully described in connection with the accompanying drawings which illustrate one embodiment of a preferred construction of my invention.

Referring to the drawings: Figure 1 is a side elevation of an asphaltic block forming press illustrating one embodiment of my invention. Fig. 2 is a side elevation of the opposite side of such press. Fig. 3 is a front end elevation of such press. Fig. 4 is a vertical section through the center of the main compression ram and alined parts upon the line 4—4 of Fig. 5 in the direction of the arrows. Fig. 5 is a plan of the press. Figs. 6 and 7 illustrate details of the rotary head moving mechanism. Fig. 8 is a sectional plan on the lines 8—8 of Fig. 1 showing in plan those portions of the press lying below that line. Fig. 9 is a vertical section through the center of the main compression ram and some alined parts upon the line 9—9 of Fig. 3. Fig. 10 is a vertical section on the line 10—10 of Fig. 5 showing details of the low pressure ram, revolving head, block ejecting and block removing means. Fig. 11 is a horizontal section on the line 11—11 of Fig. 1. Fig. 12 shows on a larger scale the details of the ejecting and block removing mechanism as shown in Fig. 10. Fig. 13 is a horizontal section of the same on the line 13—13 of Fig. 12. Fig. 14 is an enlarged sectional view of parts shown in Fig. 12. Fig. 15 is a vertical section on the line 15—15 of Fig. 2 showing the embodiment of auxiliary plunger pull down device herein described. Fig. 16 is a vertical section on the line 16—16 of Fig. 2 showing one type of mechanism for applying compression to the material while in filling position and one type of device for regulating the thickness of the finished block. Figs. 17 and 18 illustrate the mold plungers and attachments. Figs. 19–23 inclusive illustrate the relative position of the mold, mold cover and mold plunger during various operations which will be hereinafter described. Figs. 24–27 inclusive illustrate one form of safety device which may be used to prevent damage to presses of the character described. Fig. 28 illustrates the steam cylinder and its connections. Fig. 29 illustrates a vertical transverse section of the machine on the line 17—17 of Fig. 5.

While my invention is of general application, it is particularly adapted for use in compressing what are commonly known as asphalt paving blocks, composed mainly of crushed rock and a cementitious asphaltic binder, and therefore I have elected to disclose my invention in connection with such use.

The embodiment of my invention herein described and illustrated in the accompanying drawings is provided with a base 1 (Fig. 1) to which is attached a ram cylinder 2 having a chamber containing the vertically reciprocable ram 3 (Figs. 4 and 9) which is effective to compress material in molds to be described. The chamber of the ram cylinder and its connections preferably contain a body of liquid of normally substantially fixed quantity and constant body. Pressure is preferably imparted to the liquid in this chamber by displacing means herein shown as the displacing plunger 4 (Fig. 9) which is thrust into the liquid by any suitable actuator, a preferred construction of which will be hereinafter described. I prefer however that this displacing means shall operate through a stroke normally determined by the resistance of the material under compression. If such is the case the displacing means is compensative being longer or shorter according to the point in its stroke at which a predetermined resistance is encountered by the means responsive to its movement. Where the pressure system coöperates with a plurality of molds, I may, if desired, provide a separate ram 5 (Fig. 11) which I prefer to supply with pressure from the displacing means which supplies pressure to the ram 3. To this end, I may connect the cylinder 6 of the ram 5 with the main cylinder 2 by a passage 7 so that liquid under pressure may circulate through the whole space beneath the two rams making in effect one liquid containing chamber. I prefer to make the cylinder 2 and the cylinder 6 in one single casting and to so arrange the relative positions and dimensions of my displacing plunger, rams and chamber as to substantially eliminate all speed restrictive hydraulic resistance in the operation of the press. I prefer that the ram 5 should be of smaller pressure receiving area than the ram 3 so that it may impart less pressure than is imparted by the latter and also of less weight per square inch of pressure receiving area than the ram 3 so that when pressure is applied it may normally begin to move before the ram 3 and when the displacing plunger is retracted it may normally begin to descend after the ram 3.

From the foregoing description it may readily be understood that movement of the plunger 4 on its displacing stroke will displace liquid in the chamber beneath the rams and impart multiplied pressure to both rams, the force imparted to each depending on its pressure receiving area, the area of the displacing means and the pressure imparted to the latter. In starting and stopping the press, or at any other time, less resistance may be offered to either ram than is intended. If this were the case the ram meeting the least resistance would be moved farther than is intended by the displaced liquid, with the result that the other ram would not impart adequate pressure to the material under compression. To guard against this I preferably provide each ram with arbitrary stroke limiting means herein shown as including a ring or projection 7 (Fig. 4) on the ram 3 and a ring or projection 8 (Fig. 10) on the ram 5 and above these rings sectional rings 9 and 10 firmly fixed to the ram cylinders. Below the rings I prefer to provide projections or shelves on which the rings 7 and 8 may rest when desired. Between the shelf of each and the ring attached to the cylinder I provide sufficient space, more than the height or thickness of the ring of each ram respectively to permit the maximum desired stroke of the respective rams. When one ram has effected its maximum desired range of compressive movement the ring of the ram abuts on the ring of the cylinder, thus preventing further upward movement and rendering the stroke of the displacing means effective to force liquid under the other ram and insure its receiving proper pressure. In ordinary operation however I prefer that each ram should be stopped on its compressing stroke by the resistance of the material under compression and not by the stroke limiting means.

Another function of the stroke limiting device disclosed may be, if the rams are of different weights per square inch of area as illustrated, to permit return of the ram having the lesser weight per square inch of pressure receiving area by permitting the ring of the ram with greater weight per square inch of such area to first bottom on the shelf or projection below it as before mentioned. The ram 3 (Fig. 4) is preferably made with a detachable portion 11, attached to the main portion 3 by bolts 12 or other suitable attachment means. This permits the ring 9 which is preferably divided in three or more portions to be inserted after the main portion of the ram has been put in place. The detachable portion 11 is then bolted in place. I prefer to provide a passage herein shown as a somewhat loose joint between the outside of the ring or projection 7 and the wall of the cylinder so that liquid may pass from below the ring to above the ring and vice versa. If desired, I may make this passage somewhat restricted so that the passage of the partially entrapped liquid may somewhat retard the rapid stroke of the ram when the mold is empty or for other reasons no substantial resistance is offered to its compression stroke. This retardation, among other things, serves to restrain injurious impact of the ring 7 upon the ring 9. The ram 5 is preferably provided with a ring 10 and projection 8 for a similar purpose as is shown in Fig. 10.

In the embodiment of my invention herein described, to save space, I preferably provide an opening or hole 13 in the ram 3 through which the displacing plunger 4 may pass. This hole is preferably of such proportions as to permit the rise and fall of the ram without permitting it to turn any substantial amount in its cylinder. In order that the liquid displaced by the displacing plunger may readily find its way under the ram, I preferably provide conduit means 14 (Fig. 4) establishing communication between the hole 13 and the liquid beneath the ram. To permit ready removal of the displacing plunger (Fig. 4) I preferably supply an opening 15 Fig. 9 covered by a plate 16 opposite the opening 13 for the displacing plunger 4. Stuffing boxes, packing and glands are preferably provided for the displacing plunger and each of the rams. It will be noted that the embodiment of my pressure system herein disclosed is normally valveless and that every movement of the displacing means produces synchronous movement with it of one or the other or both of the rams which constitute one form of responsive means. In any case I prefer that the responsive means should be normally always and only responsive to movement of the displacing means. It will also be noted that in the illustrative embodiment herein described the liquid containing chamber or receptacle is completely filled with a normally substantially fixed quantity and substantially constant body of present transmission liquid.

As before stated, I prefer that the press be of great power combined with high speed, and in order to combine these qualities in a hydraulic press I prefer to dispense with all valves in the normal operation of the press by using the before described body of liquid instead of a changing body provided with valves as in presses of the accumulator and relief discharge valve types.

A replenishing pump 18 (Fig. 9) serves, through suitable connections, preferably including a pipe and a check valve or check valves, to compensate for any leakage of liquid from the liquid containing chamber during the operation of the press. The replenishing pump is ordinarily not a working part of the press itself but is purely auxiliary, being preferably manually operable by the operator, at times if desired during the operation of the press, but preferably not during the periods of high pressure in the liquid containing cylinder. The amount of use of this replenishing pump depends upon the condition of the packing.

In the embodiment of my invention shown in the drawings, I actuate the displacing plunger 4 by fluid pressure acting on a piston 19 (Fig. 9) in the cylinder 20 which fluid pressure coöperating with the piston 19 and the cylinder 20 may constitute one form of pressure determining yielding means. I prefer to use steam or other elastic fluid pressure which is admitted to the ends of the cylinder alternately preferably by means of a slide valve 21 in a suitable steam chest. In the particular type of valve mechanism shown, the slide valve 21 is controlled by mechanism which will be hereinafter described. I prefer that a port leading from the valve chest 21ª to the interior of the cylinder 20 at the end nearest the displacing plunger should be provided with a check valve 22. A by-pass 22ª permits the passage of but a small amount of steam when steam is admitted to the end of the cylinder which it controls. The action of this check valve is to permit differentiation in the capacity of the port so that it may be of greater area when steam is passing through it in one direction than when steam is passing through it in the opposite direction.

I prefer to provide elastic cushioning means at one or both ends of the steam cylinder to restrain impact. In the embodiment herein disclosed the ports 23 and 24 (Figs. 9 and 28) open into the steam cylinder at points somewhat removed from the ends of the cylinder. The passage of the piston past these ports entraps, either wholly or partially, as desired, a quantity of elastic fluid in the end of the cylinder, thus forming an elastic cushion which aids in bringing the piston to rest without impact or shock. In order that steam may get back of the piston to start it on its stroke in the opposite direction, I have herein shown a by-pass 25 leading into the cylinder at a point nearer the end than where the main port 23 enters. I prefer to control this by-pass by a check valve 27. This check valve opens when steam is to be admitted to the end of the cylinder with which it coöperates, permitting the steam to push the piston 19 so as to open the larger port. On the return stroke of the piston the check valve is closed, preferably, either by a spring or fluid pressure. Thus when the piston 19 closes the port 23 elastic fluid is entrapped to form an elastic fluid cushion. A similar device is preferably provided for the opposite end of the cylinder including the port 24, the by-pass 26 and the check valve 28. Owing to the great difficulty in controlling the momentum of the displacing means on both its compressing and return strokes, I have also provided positive impact preventing means which positively prevents impact of the piston 19 on either end of the cylinder 20.

The embodiment of positive impact controlling means herein shown comprises (Fig. 1) a crank 29 mounted on any suitable pedestal 30 provided with connecting rods 31 (Figs. 1 and 5) attached to a crosshead 32 connected to the displacing plunger 4. The crank and connecting rods are of such proportions that the piston 19 (Fig. 9) can never strike either end of its cylinder. The crank can never get on center because the steam and momentum cannot hold straight the line of the axis of the crank, the axis of the crank pin and the axis of the point of attachment of the connecting rod to the displacing means. This is because of the preferably heavy weight of the crank and connecting rod which weight increases in its retarding effect as the piston approaches the ends of the cylinder, and also, if such be used, because of the steam cushions in each end of the cylinder.

The operation and construction of the floating valve control, which also serves to control the displacing plunger and the parts moving therewith, will be later explained in connection with the automatic timing mechanism which times the embodiment of my invention herein disclosed.

The preferred construction of pressure instrumentalities heretofore described, preferably coöperates with molding instrumentalities including at least one mold together with means to open said mold for the introduction of materials to be pressed and for the expulsion of compressed material, and also mold closing means adapted to close said mold when pressure is to be applied to the contents thereof. Any suitable apparatus may perform this operation, which apparatus I elect to term mold opening and closing means, but I prefer that the heretofore described pressure instrumentalities shall coöperate with a plurality of progressive molds which may conveniently be contained in a mold carrier herein shown as a rotatable mold table.

The rotatable mold table is a preferred instrumentality by which to produce a progressive mold type of press as illustrated in the drawings. A progressive mold press connotes a press comprising a plurality of molds, the contents of which are subjected to different operations within the same portion of a cycle of operation of the press.

In the illustrative embodiment shown in the drawings three pressure resisting or receiving bolts or columns $32^a$, 33 and 34 (Figs. 1 and 8) support a preferably unyielding bulkhead 35 (Fig. 1). This bulkhead or abutment which may form the main pressure receiving portion of the press above the molds may be held from movement by the pressure of the compressing instrumentalities by nuts 36, 37 and 38 (Figs. 1 and 2) attached to the columns, the latter being preferably secured firmly at their lower ends to the bed 1 or members rigidly attached thereto. To this bulkhead are preferably attached a plurality of hardened, renewable plates positioned so that they form covers or pressure receiving plates for the molds to which pressure is applied. Below this bulkhead or abutment I prefer to provide a rotatable table 39 which may be conveniently mounted on a cone $39^a$ (Fig. 10) revolving on one of the columns, herein shown as the column 34. I prefer to supply a nut $38^a$ by which the cone $39^a$ may be raised and lowered to adjust the rotatable table in close relation with the bulkhead 35.

The rotatable table 39 is preferably provided with a plurality of mold openings or molds herein shown (Fig. 5) as ten, numbered respectively 40 to 49 inclusive, though any desired number may be provided. Each of these molds is preferably provided with a suitable mold plunger 50 (Fig. 4) which preferably travels with the rotatable table as it revolves, part of each remaining in its own mold and being reciprocable therein.

In its relation to the material to be compressed a mold plunger may be regarded as the surface which contacts with the material in the mold and imparts pressure to such material by actual contact therewith, while in its relation to parts of the press it may be regarded as such surface together with the parts attached thereto and reciprocating therewith.

I prefer to use mechanism for rotating the mold table which rotates it intermittently, making as many stops during one revolution of the mold table as there are molds. The table rotating mechanism will be hereinafter described.

In Fig. 5 the mold 42 is in position to receive pressure from the low pressure ram. If desired, I may provide the high pressure ram with a pressure apportioning or distributing plate 51 (Figs. 1 and 9) adapted to distribute the pressure from the high pressure ram to a plurality of mold plungers. In the embodiment herein shown, a portion of this plate $51^a$ (Fig. 9) adapted to impart pressure to the plunger of the mold 40 (Fig. 5) is higher than another portion $51^b$ (Fig. 9) adapted to impart pressure to the plunger of the mold 41. Thus by a given movement of the high pressure ram a higher pressure will ordinarily be imparted to the contents of the mold 40 than to the contents of the mold 41 if they contain substantially the same amount of material. It will be noted that the ram cannot turn in its cylinder and so render the platen inoperative because of the device for preventing such turning heretofore described. After the next move of the mold table the contents of the mold 41 receives its highest pressure and the contents of the mold 42 receives its intermediate pressure. In the press illustrated the molds 47 and 48 are in position where their mold plungers are elevated to eject the completed blocks by ejecting means hereafter to be described, and where the block removing means herein shown as provided with the sweep arm 52 and 53 sweep the completed blocks from the mold table to conveyers numbered 52ª and 53ª which carry them through a cooling agent, preferably a water bath.

The mold 43 is in filling position alined under and in substantially register with an upwardly tapering substantially vertical neck or conduit 54ª (Figs. 19 and 20) through which material is fed by gravity action to fill the molds. Thus in the embodiment of my invention herein described, the mold 43 is in filling position, the mold 42 is in position to receive the low pressure, the mold 41 to receive the intermediate pressure, and the mold 40 to receive the high or final pressure. The mold 49 contains a completed block not yet elevated or ejected from the mold. The molds 48 and 47 are in ejecting and block removing positions. The molds 46, 45 and 44 contain no material but preferably have their plungers elevated for cleaning and lubricating purposes and are ready to be pulled down on reaching filling position.

As before explained, I prefer to move the rotary table as many times to complete a revolution thereof as there are molds therein contained. In the embodiment disclosed in the drawings, I accomplish this by positive mechanical means including a pulley 54 (Fig. 8) on a shaft 55 on which is keyed the bevel gear 56 which drives a bevel gear 57 keyed on a shaft 58. To the shaft 58 is attached the crank 59 (Fig. 5). The shaft 58 in plan revolves contraclockwise. On the crank pin of this crank is mounted one end of a connecting rod 60, the opposite end of which is mounted on a guiding or pawl carrying arm 61, which is pivoted on the column on which the mold table rotates. It will readily be seen that rotation of the shaft 58 will impart to the arm 61 a to and fro or rocking motion, the number of degrees of which is determined by the distance from the axis of the shaft 58 to the axis of the crankpin, and the distance from the axis of the guiding or pawl carrying arm 61 at which the connecting rod is connected. To transmit motion from the guiding or pawl carrying arm 61 to the table a pawl 62 is connected to the guiding or pawl carrying arm which engages notches 63 in the periphery of the rotary mold table.

I prefer that the pawl 62 shall engage the table when the connecting rod 60 and the crank 59 are substantially alined as indicated and that the pawl should be disengaged from the table when the crank and connecting rod are substantially alined at the opposite end of the throw of the crank. This is one way, as may readily be understood, by which the mold table is started in motion at a relatively low speed increasing until the middle of the travel is reached, and then is gradually slowed down so as to be at rest when finally the pawl is disengaged.

The before described motion of the mold table is adapted to substantially eliminate all shock or impact which commonly attends the starting and stopping of heavy bodies. I prefer to cause a plurality of reciprocations of my mold table moving apparatus for each effective reciprocation thereof. In the embodiment of my invention illustrated in the drawings, I provide five idle strokes of this mechanism for each effective stroke thereof. That is the shaft 58 revolves three times for each time that the table is moved. This enables me to move the table in a less portion of the cycle of operation of the press than would be possible if every stroke of the guide arm in one direction produced corresponding movement of the table. Thus the table is moved in one sixth of a cycle of the operation of the press, as illustrated, while if every stroke of the connecting rod in one direction were effective to move the table, one half of the cycle of the operation of the press would be occupied in moving the table, leaving a correspondingly reduced portion of the cycle for filling the molds, pressing the material therein, ejecting therefrom, and removing the completed blocks from the table. For the purposes of this application, I regard as one cycle the period between the completion of the final compression of one block and the completion of final compression of the next block.

As herein shown I time the engagement and disengagement of the pawl 62 by means of a cam 64 on the shaft 65 (Fig. 4). I have shown the single cycle timing shaft 65 making one revolution for every three revolutions of the shaft 58, on which is mounted the crank for moving the rotary mold table. The cam 64 is so shaped and disposed that it moves the lever 66 which is pivoted on any suitable fulcrum shown at 67. The movement of this lever, which is provided at its upper end with a curved portion 68, formed in the arc of a circle centered in the center of the mold table (Figs. 5, 6 and 7), rocks the pawl 62 on the center 69 permitting it to engage the table when the upper portion 68 of the lever 66 moves away from the table. As herein shown the actual force which causes the pawl to engage the table is a yielding force stored up in the spring 70, one end of which is preferably attached to the pawl 62 by a connection herein shown as a pivoted clip 70ª, and the opposite end of which is connected to the pawl carrying arm 61.

To explain more fully, during two and one-half revolutions of the crank shaft 58 the pawl 62 is held out of engagement with the table because the curved portion of the lever is held against the roller 71 (Fig. 7) by reason of the roller 72 (Fig. 4), at the bottom of the lever 66, being against the higher portions of the cam 64. At the start of the effective half revolution of the crank shaft 58 the roller 72 enters the lower portion of the cam 64, and the spring 70 causes the pawl to engage the table. When the effective half revolution of the crankshaft is complete the roller 72 returns to the higher portion of the cam 64, and the pawl is thereby disengaged through movement of the lever 66 and the curved portion 68. It will be understood that the above described mechanism for producing this result may be greatly varied without departing from the spirit of the invention herein disclosed.

As before stated, I prefer to supply each mold with a mold plunger which rotates with the mold table, its upper face always remaining within and forming the bottom of the mold.

In presses of this character heretofore constructed it has been customary to use very heavy mold plungers to insure their proper drop when it is desired to fill the mold. This is open to serious objection when used in connection with a movable mold because of the great additional weight to be moved. It is desirable of course to keep the moving parts of the press as light as possible.

Another difficulty which has been experienced in presses is that there is a tendency for the plunger after compression to pull away from the lower surface of the block. With sticky bituminous substances this frequently results in tearing away a portion of the lower surface of the completed block.

The embodiment of my invention disclosed in the drawings is provided with a preferred construction of plunger controlling means and means to provide downward movement for assisting the descent of the plungers to fill the molds. Such means to provide downward movement does not travel with the table and hence does not act as a speed restrictive or momentum increasing element.

As shown in the drawings (Fig. 17) each plunger 50 is provided with a link 73 which connects with a lever 74 fulcrumed at 75 on a projection from the plunger guide 76 which preferably depends from the mold table and is preferably secured thereto. The lever 74 preferably passes between a lever guide 77 and a portion of the plunger guide 76, the lever guide being preferably provided with spring washers or other yielding means to cause the lever 74 to be frictionally held between the lever guide 77 and the plunger guide 76.

As herein shown the lever guide 77 exerts sufficient pressure against the lever 74 to prevent movement of the plunger either up or down, except when acted on by some exterior force, other than gravity occasioned by its own weight. Any other suitable frictional means preferably exerting yielding pressure may be used however without departing from the spirit of my invention. I also prefer to provide means to pull down the mold plungers successively when in filling position. To this end I may provide (Fig. 15) on the single cycle shaft 65 a cam 78, operating on a roller 79 in one end of a lever 80 fulcrumed at 80ª which operates to store up energy as by raising a weight 81 connected to a lever 82 which is provided with a projection 83. I prefer to raise this weight at such a time that the projection 83 shall be above the projecting end of the lever 74 when the table is nearing the end of each of its movements. I then prefer to have the cam 78 let the weight down quickly, but constantly control it, so that there may be no substantial impact occasioned by its descent. During the descent the projection 83 operates on the projecting end of the lever 74 to pull down the plunger. In this way I am enabled to bring great weight to bear to bring down each plunger without continuously carrying an additional great weight on each plunger. In lieu of the weight, or in addition thereto as shown, I may use mechanical or elastic means, such as a compressed elastic fluid, to exert force to bring the plunger down.

As herein shown, the lever 82 (Fig. 15) is provided with a connection 84 attached to a piston 85 in a cylinder 86 fastened to any suitable support. The raising of the lever 82, by the cam 78, compresses air in the top of this cylinder 86 which when released expands and so exerts force to push down the lever 82 and hence to push down the mold plunger in the mold which is being filled. While I prefer to compress the elastic fluid as illustrated any suitable compression means may be utilized.

In the manufacture of asphalt blocks and blocks formed from granular or porous material, great difficulty has heretofore been experienced in reducing the amount of air in the material compressed. When the material is compressed in a closed mold, while much air escapes through the joints or narrow openings around the top and bottom of the mold, a quantity of air is entrapped in the material under compression. When pressure is taken off this expands again and in escaping, somewhat cracks the structure and surface of the block. To ameliorate this difficulty, to obtain a greater density of the blocks, and for other reasons, the material is preferably subjected to a plurality of compressions. Even this however seldom eliminates all the minute air pockets from the completed article.

I prefer greatly to decrease the amount of air in the material prior to its compression in a closed mold and thus increase the density of the ultimate block, by the following operation: To each mold plunger, after the mold is filled and while the mold is covered only by the column of material in the mold filling neck, is imparted an upward movement which compresses the material in the mold against the material in the neck above. The material in the neck above being porous or granular permits the air driven out by this "open mold compression" to escape readily, thus reducing greatly the amount of air in the mixture when ready for compression in the mold when closed. Some of the air may also escape down around the mold plunger and through the joints between the top of the mold table and the bottom of the filling neck. In the embodiment of my invention shown in the drawings I accomplish this expulsion of air by a cam 87 (Fig. 16), on the single cycle shaft 65, which operates a roll 88 of a lever 89 having a fulcrum 90. To the opposite end of this lever is connected an open mold compression member 91 which, subsequent to the mold filling operation, is given upward compressive movement by the cam 87. This upward movement is imparted to the mold plunger in the mold in the position occupied by the mold 43 in Fig. 5. The downward motion of the plunger is limited by its contact with the rod 91.

It is desirable to provide means to vary the downward limit of mold filling stroke of the mold plunger and also to vary the limit of upward movement of the mold plunger occasioned by the open mold compression. These in the embodiment of my invention illustrated are both performed by varying the position of fulcrum 90. I prefer to do this by providing a threaded portion in the base 92 of the fulcrum 90 and the feed screw 92$^a$. The latter may be conveniently rotated by sprockets 93 and 94, a chain 95 connecting them, a shaft 96 and a hand wheel 97 being provided to rotate the sprocket 94. The hand wheel 97 is preferably located in a position convenient to the operator. These adjustments which may readily be performed while the press is in operation enable the operator to maintain a substantially constant thickness of block, regardless of the varying density or consistency of the material which is common in plastic and especially in asphalt block materials. When a different thickness of block is desired it enables the operator readily to change the amount of material which is available for compression in the mold when closed.

In ejecting the blocks from the molds subsequent to the final compression, I prefer to eject a plurality during one period of rest of the rotatable table and preferably substantially simultaneously. To this end I have illustrated a preferred construction (Fig. 8) including a bevel gear 98, mounted on the single cycle shaft 65, meshing with a bevel gear 99, mounted on a half-time ejecting shaft 100 (Fig. 12). To this shaft is keyed a double cam 101 operating on a roll 102 mounted on ejecting member 103 which is guided by substantially parallel yoke members 104 and 105. I prefer to provide this ejecting member with ejecting studs 101$^a$ and 102$^a$, of which the stud 101$^a$ operates on the plunger in mold 48, and the stud 102$^a$ operates on the plunger in mold 47. I prefer to screw these studs into the ejecting member 103 thus providing a convenient adjustment by which their length, and hence the height to which the plungers are elevated in ejecting, may be varied. After the blocks are entirely ejected from the mold they must be removed. As before stated I prefer to perform this by the block removing sweep arms 52 and 53 which are preferably so shaped as to engage the block on one side and one end, preferably without touching the corner between them (Fig. 5). These arms may be conveniently operated from the half-time ejecting shaft 100.

The specific construction used in the embodiment of my invention illustrated in the drawings is best shown in Fig. 12. As shown the cam 106 imparts a rocking motion to a rock arm 107, pivoted at 107$^a$, to which are connected by connecting rods 108 and 109 (Fig. 13) the racks 110 and 111. In the illustrative embodiment the rack 110 serves to impart movement to a pinion 112 attached to a sleeve 113 to which is attached the block removing arm 53 (Fig. 5). The rack 111 (Fig. 13) imparts movement to the pinion 114 (Fig. 12) attached to a shaft 115 inside the sleeve 113. To the top of shaft 115 is attached another block removing arm 52 (Fig. 5). The racks operating in the same direction on opposite sides of their respective pinions, cause the latter to turn in opposite directions, thus causing the arms 52 and 53 to remove the blocks from the molds 47 and 48 respectively over the plates 116 and 117 respectively, onto the carrier belts 52$^a$ and 53$^a$ which convey the blocks through a water bath to become cooled and sufficiently solid to permit their being handled. To return the arms 52 and 53 I prefer to use yielding means such as a steam cylinder 118 (Fig. 13) the piston of which preferably pulls on the racks 110 and 111, which returns the arms at a time and speed determined by the shape of the cam 106. I prefer to so shape the cam 106 that the block may be started on its travel to the carrier belt slowly, be moved faster toward the middle of the stroke and complete the stroke at a relatively slow speed, as nearly as possible approaching the speed of the carrier belt on which the blocks are deposited.

The relative timing of the operation of the various compressing, mold operating, and material and block handling instrumentalities, in the embodiment of my invention illustrated, are determined by the location of cams, cranks and the like on a plurality of shafts which rotate at differing speeds while their relative movement is always predetermined. Thus the shaft 55 (Fig. 5) imparts movement to the single cycle shaft 65 through the medium of the pinion 119 and the gear 120. I prefer that the shaft 55 shall be multi-cycle, or in other words, revolve more than once for each operation of the final block compressing instrumentalities. The shaft 65 is illustrated as single cycle; making one revolution for each completed block turned out by the press. The shaft 58 is preferably multi-cycle making, as illustrated, three revolutions for each revolution of the single cycle shaft 65. The ejecting shaft 100 (Fig. 8) is preferably fractional cycle, making as illustrated one cycle of operation for every two cycles of operation of the single cycle shaft 65.

The timing of the compressing instrumentalities is preferably effected by a cam 121 (Fig. 8) on the single cycle shaft 65, operating on a lever 122, fulcrumed at 123, to which is attached by means of a connecting rod 124 (Fig. 9) a bell crank 125 on a shaft 126. To this bell crank is preferably connected a rod 127 acting on a lever 128 which operates on the valve stem 129, and so imparts motion to a suitable valve, shown as a slide valve 21.

I prefer that the lever 128 shall be a floating lever so that the opening of the ports of the steam cylinder may, to some extent, be controlled by the speed of the response of the piston 19 to the admission of steam to its cylinder 20. This will be largely dependent on the resistance to movement of the displacing plunger 4. To effect this control by the displacing plunger and the connected parts I have shown, in the embodiment of my invention disclosed in the drawings, a connection 130 (Figs. 9 and 1) to a rocking arm 131 on a rock shaft 131ª. Keyed on the rock shaft 131ª I have shown a cut-off lever 132 (Fig. 1) which is connected by a cut-off rod 133 to the cross head 32 connected to the displacing plunger 4.

It will be readily seen that a downward movement of one arm of the bell crank 125, by the cam 121, will cause the floating lever 128 to move the slide valve 21 into position to admit steam to the conduit 24, thus starting the displacing plunger on its compressing stroke (Fig. 9). This inward movement of the displacing plunger causes the cut-off lever 132 (Fig. 1) to be swung to the left. This, through the rock shaft 131, (Fig. 9) will cause the top of the floating lever to move to the left, thus causing the slide valve 21 to tend to more or less close the port 24. Thus the opening of the port is dependent on the speed of response of the displacing plunger to the admission of steam. It will be seen that during the foregoing operation the movement of the slide valve is determined by two components one the movement of the rock shaft 126 by the cam 121, and the other the movement of the rock shaft 131ª by the cut-off lever 132 and its connections. The movement of the rock shaft 126 is imparted to the floating lever 128 at $b$, the point $a$ acting as the fulcrum in that case. The movement of the rock shaft 131ª is imparted to the floating lever 128 at the point $a$, the point $b$ in that case acting as the fulcrum. In the normal operation of the press the rock shafts 126 and 131ª for a period both move the floating lever 128 and hence the movement imparted by that lever to the slide valve is a resultant of the motion of the two beforementioned sources of motion, and differs from the motion which either one alone could give. This resultant motion is delivered to the valve from the point $c$ of the lever 128.

To move the slide valve into position to admit fluid pressure for the return stroke of the displacing plunger I prefer to provide a spring 134 (Fig. 2) which causes the lever 122 to be positioned by the cam 121. Thus a low part in the cam 121 will cause movement of the slide valve 21 to admit steam to the cylinder for the return stroke of the displacing plunger 4. To assist the spring 134 I preferably provide a piston 134ª (Fig. 9) on the valve stem. This return movement will also be controlled by the floating valve mechanism in a similar manner to the operation on the compressing stroke above described.

It will be observed that the mold table moving instrumentalities are positively actuated from the main driving shaft 55. It will also be noted that the mold table which is of great weight moves very fast during a part of its travel. If the mold table or any of the parts traveling therewith encounters any obstruction during its travel great damage is likely to result. In the embodiment of my invention herein disclosed the mold plungers depending from the mold table would be the parts most likely to meet such obstruction because the moving instrumentalities which operate on such mold plungers may not in case of abnormal action return to such position that the mold plungers cannot strike against them when the mold table is turning.

The parts of the press illustrated which are most likely to prove obstructions are the ram 2, and the ram 3 with its platen, and the ejecting member 103 with its projecting studs. If any one of these members is not substantially in its lowermost position when the mold table is turned the bottom of a depending plunger may strike it from the side. Another possible source of danger is that the operator may not turn on the steam supply to the valve chest of the steam cylinder until after the mold table is started in operation. If this is the case the low pressure ram will not give an upward movement to the mold plunger above it in the mold filled with uncompressed material. On the next movement of the mold table the bottom of the plunger in question will strike on the inclined surface of the high pressure ram platen. The resistance of the material in the mold is so great that the mold table operating means cannot compress the material by running the mold plunger up the inclined plane. Hence the mold table will be stopped with consequent damage. To guard against these and other accidents I prefer to provide safety throw away means, which if the desired coöperating members are not in proper position and preferably if they have not made the desired movements, is effective to throw away normally effective movement of the mold table operating means until the desired conditions prevail.

In the embodiment of my invention herein illustrated, I have provided one form of engagement preventing means shown as a pawl 135 (see Fig. 24) which is adapted to engage a projection 136 on the lever 66 so that the pawl 62 (Fig. 5) cannot engage the mold table except when all the members which may obstruct the mold table and its connected parts are in proper position. I prefer to control this pawl by the following mechanism (see Fig. 24). Attached to a shaft 137 which rocks in a bearing on any suitable bracket 138 is a lever 139, the shaft 137 being provided with an arm 139ᵃ having a roller 140 alined with the cam 64 which operates the lever 66. A spring 141 acting on one end of the lever 139 serves normally to hold this roller in contact with the surface of the cam 64. Connected to the opposite end of the lever 139 is a controller rod 142, provided with a collar 143. Below the collar 143 is a sleeve 144 connected to one end of the pawl 135. A spring 145 surrounds the controller rod 142 and pushes up against the sleeve 144. The top of the controller rod 142 is connected to one arm of a bell crank 146. The other arm of this bell crank is connected by a connecting rod 147 to the locking slide 148 which will be described more fully hereinafter.

From the foregoing description of the parts, it will be understood that as the cam 64 revolves clockwise, the roller 140 will normally enter the depression of the cam 64 in advance of the roller 72 on the lever 66. As the roller 140 enters this depression in the cam 64 the spring 141 will, through the lever 139, cause the controller rod 142 to move downward, thus causing the collar 143 to push down the sleeve 144 and so elevate the opposite end of the pawl 135 which is fulcrumed at 149. The parts will now be in the position shown in Fig. 24. It will be observed that the pawl 135 is not in position to engage the projection 136. Hence the bottom of the lever 66 has been permitted to swing in and the roller 72 has entered the depression of the cam 64 and so permitted the table engaging pawl 62 to engage (Fig. 5). Returning to Fig. 24, it will be observed that the before described downward movement of the controller rod 142 will have moved the locking slide 148 to the left through the medium of the bell crank 146 and the connecting rod 147. As the cam 64 continues to revolve the roller 140 will run onto the higher portions of the cam 64, compressing the spring 141 and elevating the rod 142, and hence moving the locking slide 148 to the right. The pawl 135 however is now held against the top of the projection 136 and hence the sleeve 144 will not move up with the rod 142, but will remain stationary, the spring 145 being somewhat compressed.

When the roller 72 runs onto the higher portion of the cam 64, the projection 136 on the lever 66 will be moved to the left with the lever 66 and the pressure of the spring 145 will cause the pawl 135 to snap into place in front of the projection 136. This will prevent the lever 66 from swinging to the right at the bottom and so causing the table moving pawl 62 (Fig. 5) to engage the table, until the pawl 135 is again moved out of the way by the before described mechanism. It will be observed that if the locking slide 148 is held in its position farthest to the right the roller 140 cannot enter the depression of the cam 64 and hence that the pawl 135 will not permit the lever 66 to swing and hence the table will not be moved. I therefore prefer to provide bolts engaging the locking slide 148 which shall all be disengaged only when all parts likely to obstruct the movement of the mold table are out of the way.

The parts most likely to prove obstructions in the present press are the low pressure ram and the platen of the high pressure ram. If either of these, owing to tight packing, an excess of liquid or other cause, does not return to the bottom of its range of travel, the bottom of the depending mold plungers may strike it. As before explained it is also essential that the table should not be started with the molds filled before the rams have reciprocated, because the inclined plane of the high pressure ram platen would not compress the material. I prefer to construct the connection to the high pressure ram 3 as follows. Attached to one end of the high pressure ram is a lug 150 (Figs. 25 and 26). This is provided with a link 151 connecting with a bell crank 152 which rocks loosely on a shaft 153. The opposite end of the bell crank carries a sleeve which surrounds a connecting rod 154 which is connected to a lock bolt 155. A spring 156 surrounds the connecting rod 154, and presses on the sliding sleeve of the bell crank 152. A slot 157 is properly located in the locking slide so that when the locking slide 148 is at the right hand end of its travel the bolt 155 will engage the slot 157 if the ram is in the least elevated. It will be readily understood that elevation of the ram will elevate the lug 150 and the link 151, causing the bell crank 152 to rock, which will either cause the locking bolt 155 to engage the slot 157 or if they are not in register will compress the spring 156 so that the latter will cause the locking bolt 155 to engage the slot 157 when they are in register.

The connection to the low pressure ram 5 has two purposes: firstly, to lock the locking slide 148 when the ram 5 is elevated; and, secondly, to lock the slide unless the ram 5 has made a compressing stroke within a short time. The latter purpose is to prevent the table being revolved with uncompressed material, resulting in the damage heretofore described. The first purpose is accomplished in a manner similar to that in which it is done in the high pressure ram heretofore described. On the shaft 153 is a loose bell crank 158 one arm of which is connected to the low pressure ram 5 through the link 159 and the lug 160. The opposite arm of this bell crank engages a sleeve on the connecting rod 159ª which is connected through a leaker cylinder 160ª to a locking bolt 161 adapted to engage a slot 162 in the locking slide 148. When the ram 5 is elevated the bell crank 158 moves the sleeve to the left, either moving with it the other connections and so engaging the locking bolt 161 in the slot 162 or compressing a spring 163 which causes the bolt 161 to engage the slot when they come in register. When the ram goes down again the sleeve does not engage the rod 159ª and hence the locking bolt 161 is not removed from the locking slide 148 by this means. The removal is accomplished through another connection which insures the second requirement being fulfilled before the bolt is disengaged from the locking slide 148. This connection includes a projection 164 on the bell crank 158 (see Fig. 27) a piston rod 165 connected thereto, and a piston 166 in the leaker cylinder 160ª. The piston 166 is loosely mounted on the piston rod 165 and the latter is provided with a collar 166ª and a valve 167, sufficient slack being provided between the collar, the piston and the valve, to cause the valve to open when the piston rod 165 is moved to the left. A bypass 168 connects the opposite ends of the leaker cylinder. If desired I may provide a valve 169 to control the capacity of this bypass. The whole interior of the leaker cylinder is preferably filled with liquid.

When the up stroke of the low pressure ram 5 has caused the bolt 161 to enter its slot 162 the bolt 161 preferably bottoms before the ram has reached the end of its upward stroke. This causes the spring 163 to be somewhat compressed and causes the piston 166 to be moved to the left end of the leaker cylinder by the piston rod 165. During this travel the valve 167 will be open, permitting the liquid to pass through ports 167ª in the piston 166 into that end of the cylinder 160ª which is adjacent the piston rod 165 (Fig. 27). Thus, when the ram descends if the piston 166 is in the left hand end of the leaker cylinder 160ª, the bolt 161 will be withdrawn from the slot 162. If the press remains idle for a sufficient period of time the pressure of the spring 163 will push the cylinder 160ª and the bolt 161 to the left, forcing the liquid through the restricted bypass 168 to the left hand end of the leaker cylinder, the effective length between the lug 164 and the lock bolt 161 being so lengthened that the bolt 161 will engage the locking slide and hence the mold table will not be moved until after the ram 5 has made another compression and return stroke.

Another member which would cause trouble if it were not in its proper position when the mold table is moved is the ejecting member 103 (Fig. 25). This is preferably provided with a connecting lever 170, connected to a link 171 attached to the locking bolt 172 which preferably engages a slot 173 in the bottom of the locking slide 148. To provide a yielding connection so that the locking bolt 172 may engage the slot 173 only when in proper relation I prefer to provide the lever 170 with a torsion spring connection 174 to the ejecting member 103. Thus, if the locking bolt 172 and its slot 173 are not in register, the spring 174 will be twisted and supply the force to cause the bolt 162 to engage the slot 173 when they come in register. Thus, when the ejecting member is elevated the locking slide will be held and the table cannot revolve.

I prefer to provide a manually operable locking bolt 175 (Fig. 24) by which the operator of the press may stop the mold table when desired. This is particularly useful in starting the press, for it enables the steam cylinder to be operated until warm and all water from condensation is discharged before the press actually starts to use material, or the table starts to revolve.

In the illustrative embodiment shown in the drawings I provide a hand lever 176 convenient to the operator. This lever is mounted on a rock shaft 177 to which is connected by a torsion spring 178 the locking bolt 175 which may engage the slot 179 in the locking slide 148. As in the other locking connections, the torsion spring acts to cause the bolt 175 to engage the slot 179 when they are in register. If desired, I may provide other locking bolts connected to other portions of the press. All these locking bolts must be out of engagement with the locking slide before the mold table can be turned. While the application of the before described safety device is of course optional, it guards against the more likely forms of accident which may occur to presses of this character and renders the press substantially fool proof.

In describing the operation of the press illustrated I will start with the mold 43 in the position illustrated in Fig. 5, and follow it through one entire revolution of the mold table, describing the various operations to which the material therein is subjected, and describing the operations of the coöperating portions of the press which cause such operations on the contents of the mold. The plunger in the mold 43 on arriving at the position indicated in Fig. 5 is preferably substantially even with the top of the rotary mold table. Above the mold, and in substantial register with it, is alined the substantially vertical upwardly tapering neck or conduit 54ª (Figs. 19 and 20) which, in making asphalt blocks, is filled with a column of somewhat granular, uncompressed asphaltic and stony material. The plunger is now pulled down by the operation of the weight 81 (Fig. 15) which is let down by the operation of the cam 78 located on the shaft 65. This weight acts on the projecting portion of the lever 74 (Fig. 17) to cause the plunger to be drawn down against the resistance of the friction applied to the lever 74. In addition to this the compressed air in the top of the cylinder 86 exerts its expansive force to aid the descent of the plunger. The mold plunger having reached the bottom of its stroke (Fig. 19) lands on the open mold compression member 91. This is given an upward movement to compress the material in the mold, as before explained, by the cam 87 on the shaft 65 (Fig. 16). The upward stroke of the mold plunger imparting this open mold compression to the contents of the mold being completed (Fig. 20), the table is moved one step, the mold 43 stopping in the position previously occupied by the mold 42 (Fig. 5). This movement of the mold is occasioned by giving partial rotation to the mold table 39 by power transmitted from the driving pulley 54 on the shaft 55 through the beveled gears 56 and 57, the upright shaft 58, the crank 59, the connecting rod 60, and the pawl 62.

As before explained the table moving shaft 58 is multicycle, or in other words, rotates more than once for each completed block turned out from the press. The engagement and disengagement of the table moving pawl 62 is timed from a cam 64 (Fig. 4) on the single cycle shaft 65. This pawl 62 is yieldingly engaged at the proper time by the spring 70 by reason of the shape of the cam 64, and the crank 59 then imparts movement to the table which gradually increases in speed from the start to the middle of the movement and then gradually decreases in speed until it stops at the end of the stroke. At the end of this movement the pawl 62 is disengaged by the cam 64 and its connections, leaving the mold 43 in the position formerly occupied by the mold 42. The cam 121 now causes steam to be admitted to the port 26 of the steam cylinder 20. This starts the piston 19 on its inward or compressing stroke, opening the larger port 24 which admits steam to complete this stroke. The movement of the piston 19 causes the displacing plunger 4 to be thrust into the body of liquid contained in the cylinder 2 which causes both the low pressure ram 5 and the high pressure ram 3 to impart pressure to the mold plungers. The compressing stroke of the piston 19 stops when the predetermined pressures have been reached on the low pressure ram 5 and on the high pressure ram 3. During the inward stroke of the plunger 19 the opening of the slide valve which admits the steam is constantly under the control of the cam 121 and the floating valve cut-off lever 132. Should insufficient resistance be opposed to inward movement of the displacing plunger 42 to bring the latter to rest without substantial impact or shock, the steam in the opposite end of the cylinder will be entrapped in that portion of the cylinder which lies beyond the larger port at the left end of the cylinder 20 (Fig. 9). This will act as a cushion to prevent shock occasioned by the momentum of the moving parts. In addition to this, in the absence of sufficient resistance to the compressing instrumentalities, the crank 29 (Fig. 1) acts to bring the displacing plunger gradually to a stop, preventing the piston 19 from striking the end of the cylinder. In such case the crank normally does this before its axis, the axis of its crank pin, and the axis of the connection between the connecting rod 31 and the crosshead 32 are brought into a straight line. While the crank may, under unusual conditions, get on center, it will not remain on center for the weight of the crank and of the connecting rods serves to prevent these points being held in a straight line, or, in other words, on center. After a suitable dwell the valve cam 121 moves the slide valve 21 which exhausts the steam from the compressing end of the cylinder 20 and admits steam to the opposite end of the cylinder 20, thus causing the piston 19 to retract and so remove pressure from the material in the mold. In retracting, the piston 19 is always under the control of the valve cam 121 and the floating valve cut-off lever 132; and the steam entrapment means and the crank 29 coöperate with the floating valve mechanism and with each other to restrain or prevent impact of the piston or its connected parts with the stationary portions of the press. The mold plunger does not retract any substantial amount by reason of the removal of pressure above described, because of the frictional manner in which it is held, but it may retract sufficiently, because of the expansion of the material under compression, to relieve all substantial pressure against the abutment and pressure receiving plates above the mold. The table is now moved another step, in the same manner as before described, stopping with the mold 43 in the position shown as 41 (Fig. 5). The plunger of this mold is now positioned above the lower portion of the pressure differentiating platen or plate mounted on the high pressure ram. On the next compressive stroke of the displacing means the material in this mold will receive an intermediate pressure the amount of which depends on the resistance of the material in the mold shown in position 40 (Fig. 5) which is receiving its final compression. That is to say, the larger ram imparts a predetermined aggregate pressure to the material receiving high and intermediate pressures, hence the proportion of the total pressure which is imparted to each depends on the resistance opposed to compression of the other. In ordinary operation the material does not vary to such an extent as to materially change the proportion in which the pressure of the larger ram is thus divided. The ram being retracted, as before described, the table makes another movement, the mold 43 stopping in the position shown as 40 (Fig. 5) where its contents receive the final compression.

It will be understood that in starting and stopping the press, or at other times, when resistance of the material under compression is encountered by only one of the two rams, pressure will be imparted to the ram encountering resistance from the material under compression because the resistance to upward movement of the other ram will be supplied by the stroke limiting means, illustrated in Figs. 5 and 10, including the projections around the rams and the rings held in fixed relation to the cylinders containing the respective rams. The final compression being relieved the mold is moved into position 49 where it remains idle during the compression of the subsequent block. After the next movement of the mold table when in position shown as mold 48, the block is ejected from the mold and removed by a sweep arm 53 in the following manner. The mold plunger is elevated by means of the cam 101 (Fig. 12) until the block is entirely out of the mold and the top of the mold plunger is flush with the top of the table. The block removing sweep arm 52 (Fig. 5) is now operated by means of the cam 106 (Fig. 12) to sweep the block from the mold table over the plate 116 and onto the carrier belt which carries it through a water bath to cool and set. It will be noted that the succeeding mold and molds alternating therewith are not emptied until the position 47 is reached. The mold plunger remains thus elevated during the five succeeding movements of the mold table, or in other words, until it is again in filling position. While it is thus elevated I prefer to automatically remove any material sticking to the plungers and surrounding table and automatically to wax or oil the same to prevent sticking of the material to the mold plungers during the next succeeding block-forming series of operations.

It will be readily understood that during one period of rest of the mold table, as shown in Fig. 5, the mold in position shown as 43 is filled and the open mold compression applied, the material in mold 42 is subjected to low compression, the material in mold 41 is subjected to intermediate compression, the material in mold 40 is subjected to high or final compression, and the blocks in the molds 47 and 48 are ejected and swept on to the carrier belts.

*Résumé.*—The combined and coöperating features or elements illustrated and described herein present a press of potentially high output, efficiency and marked economy in operation, as well as of superior construction and particularly adapted to production of compressed asphalt paving blocks, tiles, etc. now well known in the art. The treatment of the block material or composition progressively in the molds permits an increased output while maintaining or even increasing the intervals of time within which various steps or movements may be performed or take place; the fixed abutment to receive the pressure of the compressing instrumentalities promotes simplicity of construction and operation, and certainty of result; the use of a substantially constant body or fixed quantity of transmission liquid between the displacing means and the responsive means without the use of escape valves or the like, further permits of increased speed of operation and also promotes simplicity of construction and directness of action, responsiveness, etc.; and the replenishing means renders possible the ready maintenance of those conditions that are essential to high speed and certainty and safe operation; the single displacing plunger, especially when used in connection with a plurality of responsive devices, herein shown as rams, promotes speed of operation together with means not only convenient but frequently essential for readily applying different potential pressures to material in the molds, and by means of which results may be had that are impossible in presses lacking these features— these features permit the dwell markedly to be increased without correspondingly slowing down the press, which is of great utility in handling certain kinds of materials, such for instance as asphalt block compositions above referred to.

The compensative characteristic of an elastic fluid such as steam for a prime mover is availed of to great advantage in this press; and the independent operation of the displacing means and mold carrier or table operating means as here disclosed, insures the utmost flexibility and protection without disturbing the cycle of the press and the resultant output: the fluid pressure prime mover which will be observed determines without complication the compressive action upon the contents of a plurality of molds and which may be the same or different as to pressure, according to the necessities of the case; the balancing feature in the operation of the press prevents the frequent breakdowns common with the old type of presses and also works a marked economy in the consumption of power; it will be observed that there is no impact in arresting the movements of the parts, particularly the displacing means, the latter being under the direct control of the momentum and impact controlling crank arrangement which insures at all times against any damage should any of the valve mechanism or other parts become disarranged or unadjusted; and the floating valve mechanism or arrangement maintains virtually a constant control over the parts whose movements are regulated by it; the arrangement whereby the elastic fluid itself tends to limit and control the movements of the displacing and other parts is further promotive of safety and speed; the filling and compressing of the molds and contents thereof in the same period of rest either alone or in connection with the emptying or ejection of or from the molds contributes substantially to the efficiency and output of the press; by mounting the safety plungers to travel with the parts with which they are to coöperate, danger is eliminated of any lack of proper coöperation by reason of improper or inaccurate periodical positioning of the parts;

the mold carrier, it will be observed is started and brought to rest gradually, thereby eliminating damaging impacts or shocks and permits of a high speed movement between the limits of movements, thus greatly adding to the speed of the press; it will be observed that the table moving means serves also as a table arresting means, thus insuring constant control and further promotes speed by increasing the factor of control in the press.

The disengaging means for the table actuating means is, in the press shown, in no sense dependent upon travel of the table itself; the combination of the multiple cycle shaft for actuating the mold table and a single cycle shaft for determining or timing the movements thereof is of distinct advantage.

The relatively stationary pulldown for the traveling plungers, either alone or in connection with the friction control, eliminates liability of damage resulting from uncertain withdrawal of the plungers, furnishes also convenient means for obtaining the variable drop to the plungers, and by relieving the table of additional weight, promotes speed and reduces the liability of damage in case of any disarrangement; the preliminary compression in the mold against the upstanding column of material, herein shown as contained in the tapering filling neck, greatly improves the product or output of the press and tends to eliminate entrapped gases and also tends to increase the speed of operation of the press; the slow starting and stopping of the ejecting means, the sweep off and the table, singly and together, promote speed and also the quality of the blocks produced and the combination of multi, single and fractional cycle timing instrumentalities, tends to utilize to the utmost the possible operation and output in a given time and in a manner heretofore unknown to me.

In presses used for the purposes to which a press of this character is adapted, great damage has heretofore frequently resulted from the momentum of the heavier parts causing injury, by reason of the failure of some of the coöperating mechanisms or parts properly to function in the operation of the press. In the press here illustrated, for example, if any coöperating part should fail to be in its proper position or to move properly with respect to the movements of the mold carrier or table, the necessary weight and momentum of the latter might work serious damage, so in the press herein illustrated I have disclosed one embodiment of means requiring the proper position and function of as many of the parts coöperating with the table—or it might be with any selected instrumentality of the press—as a prerequisite to the effective operation of the means for moving the table or that selected instrumentality, whatever it may be, thus to an extent either partially or completely making it possible to prevent the failure of any part in any respect, either as to position or movement, from doing damage such as will result from the subsequent movement of another or other part or parts.

It will be understood that the foregoing description merely illustrates a preferred operation of the embodiment of my invention illustrated in the drawings, and that it may be greatly varied without departing in the least from the spirit of my invention.

While in the foregoing description I have described a preferred construction of machine and a preferred operation thereof, I wish it understood that what I desire to secure by Letters Patent is not confined to such construction or operation but is best set forth in the following claims.

Claims:

1. An automatic, block-forming hydraulic press comprising in combination a rotatable mold table; a plurality of molds in said mold table; intermittently operating mold table rotating means; a liquid displacing plunger; a ram having a greater relative cross section than said displacing plunger; liquid pressure transmission means operatively interposed between said displacing plunger and said ram; a fixed pressure-resisting abutment operatively positioned above a mold when in compressing position, said abutment coöperating with said ram to compress the contents of a mold when in compressing position; and automatic timing means to time relatively the operation of said displacing plunger and of said mold table rotating means.

2. A high speed, high power, automatic asphalt-block-forming press comprising in combination a rotatable mold table having a plurality of molds; intermittently operating mold table rotating means; a liquid displacing plunger; an elastic fluid operated actuator for said displacing plunger; a ram having greater relative cross section than said displacing plunger; liquid pressure transmitting and multiplying means operatively interposed between said plunger and said ram; an unyielding, pressure-resisting abutment operatively positioned above a mold when in pressing position, said abutment coöperating with said ram to press the contents of a mold when in pressing position; and automatic timing means to time relatively the operation of said mold table rotating means and of said displacing plunger.

3. A high speed, high power, automatic asphalt-block-forming, hydraulic press comprising in combination a rotatable mold carrier having a plurality of molds; mold carrier operating means to give to said mold carrier alternate periods of motion and rest; a variable stroke, liquid displacing plunger; a ram having a greater relative cross section than said displacing plunger; liquid pressure transmission means operatively interposed between said displacing plunger and said ram; a pressure-resisting abutment operatively positioned above a mold during a period of rest, said abutment coöperating with said ram to press the contents of a mold during a period of rest; and automatic timing means to time relatively the operation of said mold carrier operating means and of said displacing plunger.

4. An automatic, asphalt-block-forming press comprising in combination a rotatable mold table having a plurality of molds; intermittently operating mold table rotating means to progressively present said molds for filling, compressing and emptying; a liquid displacing plunger; a ram having a greater relative cross section than said displacing plunger; a receptacle containing a substantially fixed quantity of pressure transmission liquid operatively interposed between said displacing plunger and said ram; an unyielding pressure-resisting abutment operatively positioned above a mold when in compressing position, said abutment coöperating with said ram to press the contents of a mold when in compressing position; and automatic timing means to time relatively the operation of said displacing plunger and of said mold table rotating means.

5. An automatic, block-forming press comprising in combination a rotatable mold table having a plurality of molds; intermittently operating mold table rotating means to progressively present said molds for filling, compressing and emptying; a reciprocating ram to impart pressure to the contents of said molds; a liquid displacing plunger having a smaller relative cross section than said ram; a receptacle constantly filled with a substantially constant body of pressure transmission liquid operatively interposed between said displacing plunger and said ram; yielding means coöperating with said displacing plunger and said ram to predetermine the pressure transmitted to the contents of said molds; and automatic timing means to time relatively the operation of said displacing plunger and of said mold table rotating means.

6. A hydraulic press comprising in combination a rotatable mold carrier having a plurality of molds; mold carrier operating means to give said mold carrier alternate periods of motion and rest; a liquid displacing plunger; a ram having a greater relative cross section than said displacing plunger to impart a predetermined pressure to the contents of said molds; a receptacle containing a normally fixed quantity of pressure transmitting liquid operatively interposed intermediate said displacing plunger and said ram; and automatic timing means to time the relative operation of said displacing plunger and of said mold carrier operating means.

7. A high speed, high power, hydraulic press comprising in combination a rotatable mold table having a plurality of molds; mold filling means; a ram to impart pressure to the contents of said molds; a liquid displacing plunger of smaller pressure giving area than the pressure receiving area of said ram; a normally valveless receptacle containing a fixed quantity of pressure transmitting liquid operatively interposed intermediate said ram and said displacing plunger; and automatic timing means to time relatively the operation of said mold filling means and of said displacing plunger.

8. An asphalt block-forming hydraulic press comprising in combination a rotatable mold carrier having a plurality of molds; a plurality of mold plungers; mold carrier operating means to give said carrier alternate periods of motion and rest; a receptacle containing power transmission liquid; a ram responsive to movement of said liquid to impart pressure to said mold plungers; a variable stroke, liquid displacing plunger for said liquid operating in said receptacle and having a smaller relative cross section than said ram whereby the stroke of said displacing plunger may vary to compensate for varying positions in the movement of said mold plungers at which a predetermined resistance may be encountered; and automatic timing means to time relatively the operation of said mold carrier operating means and of said displacing plunger.

9. A block-forming, hydraulic press comprising in combination a rotatable mold carrier having a plurality of molds; mold carrier operating means to give said carrier alternate periods of motion and rest; a reciprocatory ram; liquid power transmission means; a fluid actuated, variable stroke, liquid displacing plunger having a movement longer than the movement of said ram and having a smaller relative cross section than said ram; means to utilize said longer movement automatically to control the speed of said displacing plunger; and automatic timing means to time relatively the operation of said displacing plunger and of said mold carrier operating means.

10. A high speed, high power, hydraulic press comprising in combination a rotatable mold table having a plurality of molds; mold filling and emptying means; a ram; a liquid displacing plunger having a smaller relative cross section than said ram; an elastic fluid actuated prime mover for directly actuating said displacing plunger; a receptacle containing pressure transmission liquid operatively interposed between said ram and said displacing plunger; a crank actuated by said prime mover to restrain injurious impact thereof and of the parts moved thereby with other portions of said press; and automatic timing means to time relatively the operation of said prime mover and of said mold filling and emptying means.

11. A high speed, high power, hydraulic press comprising in combination a rotatable mold carrier having a plurality of molds; a plurality of mold plungers reciprocable in said molds and rotating therewith; mold carrier operating means to give said mold carrier alternate periods of motion and rest; a low pressure hydraulic ram to impart relatively low pressure to said mold plungers; a high pressure hydraulic ram to impart relatively high pressure to said mold plungers subsequent to their movement by said low pressure ram; liquid pressure creating means to impart movement to said rams; fixed pressure receiving means above a plurality of molds to receive pressure imparted by said high and low pressure rams; and means automatically to time relatively the operation of said rams and of said mold carrier operating means.

12. A high speed, high power, automatic, hydraulic press comprising in combination a rotatable mold table having a plurality of molds; intermittently operating table rotating means; a plurality of mold plungers reciprocable in said molds and moving therewith; a liquid displacing plunger; a receptacle containing a substantially fixed quantity of pressure transmission liquid; a ram or rams having a greater relative cross section than said displacing plunger responsive to movement of said displacing plunger to substantially simultaneously impart to one of said mold plungers one potential pressure and to another mold plunger a higher potential pressure; and automatic timing means to time relatively the operation of said displacing plunger and of said mold table rotating means.

13. A block forming press comprising in combination a rotatable mold carrier having a plurality of molds; mold carrier operating means to give said mold carrier alternate periods of motion and rest, including an engaging pawl to engage said mold carrier, said pawl having a plurality of reciprocable inoperative movements between succeeding movements engaging said mold carrier; compressing means including an elastic fluid actuated prime mover; and automatic timing means to time relatively the operation of said prime mover and of said mold carrier operating means.

14. An automatic, block press comprising in combination a rotatable mold carrier having a plurality of molds; mold carrier operating means including a connecting rod and pawl to move said mold carrier with alternate periods of rest and a cam operated lever which by its cam operated movement serves to permit an engaging movement and to give a disengaging movement to said pawl; compressing means; and automatic timing means to time relatively the operation of said compressing means and of said mold carrier operating means.

15. An automatic block press comprising in combination a rotatable mold carrier having a plurality of molds; pawl reciprocating instrumentalities and pawl engaging and disengaging instrumentalities whereby to give said carrier alternate periods of motion and rest, said reciprocating instrumentalities and said disengaging instrumentalities being actuated by different revolving shafts of different timing cycles; compressing instrumentalities; and automatic timing means to time relatively the operation of said compressing instrumentalities and of said means to give said carrier alternate periods of motion and rest.

16. An automatic block-forming press comprising in combination a rotatable mold carrier having a plurality of molds; a plurality of mold plungers reciprocable in said molds and rotating therewith; mold carrier operating means to give said mold carrier alternate periods of motion and rest; compressing means for said mold plungers; means not rotating with said mold carrier to apply force to produce downward movement of said mold plungers when said molds are in filling position; frictional means to restrain substantial downward movement of said plungers when said molds are not in filling position; and automatic timing means to time relatively the operation of said compressing means and of said mold carrier operating means.

17. An asphalt, block-forming hydraulic press comprising in combination a rotatable mold table having a plurality of molds; a plurality of mold plungers; intermittently operating mold table rotating means to progressively present said molds for filling, compressing and emptying; means to vary the limit of mold filling stroke of said mold plungers; a closed chamber containing a substantially constant body of pressure transmission liquid; a liquid displacing plunger; a ram having a greater relative cross section than said displacing plunger to impart compressive movement to said mold plungers; and automatic timing means to time relatively the operation of said displacing plunger and of said mold table rotating means.

18. A high speed, high power, asphalt-block-forming, hydraulic press comprising in combination a bulkhead; a plurality of strain resisting columns supporting said bulkhead; a rotatable mold carrier revolving on one of said columns; a plurality of molds in said mold carrier; a plurality of mold plungers reciprocable in said molds; mold carrier operating means to give said mold carrier alternate periods of motion and rest; an upwardly tapering mold filling neck substantially perpendicularly alined above one of said molds and in substantial register therewith when said mold is in mold filling position whereby said molds may be filled by the action of gravity substantially simultaneously with the retraction of said mold plungers; a ram; a reciprocating liquid displacing plunger having a smaller relative cross section than said ram; a chamber containing pressure transmission liquid operatively interposed between said ram and said displacing plunger; and automatic timing means to time relatively the operation of said displacing plunger and of said mold carrier operating means.

19. A high speed, high power, automatic, asphalt-block-forming hydraulic press comprising in combination a rotatable mold carrier having a plurality of molds; mold carrier operating means to give said mold carrier alternate periods of motion and rest whereby to bring said molds into filling, compressing and ejecting positions; means to maintain an upright column of asphaltic material above the mold filling position of said molds and to intermittently permit said column to advance by gravity action to fill a mold during a period of rest of said mold carrier; a receptacle containing liquid to transmit pressure to said mold plungers; a displacing plunger for said liquid; a ram having a smaller relative cross section than said displacing plunger; a prime mover for said displacing plunger; means to increase the pressure transmitted from said prime mover to said mold plungers until its maximum pressure is balanced by the resistance of material under compression in said molds or until the power of said prime mover is automatically cut off; and automatic timing means to time relatively the operation of said displacing plunger and said mold carrier operating means.

20. A high speed, high power, automatic, asphalt-block-forming hydraulic press comprising in combination compressing instrumentalities including a ram, a liquid displacing plunger having a smaller relative cross section than said ram, liquid pressure transmitting means intermediate said ram and displacing plunger, a prime mover for said displacing plunger, and predetermining means to predetermine the pressure transmitted by said displacing plunger to said responsive ram; coöperating instrumentalities including a rotatable mold carrier having a plurality of molds, a fixed abutment above one or more of said molds when in pressure receiving position to resist the compressive action on the contents of said mold or molds, a plurality of mold plungers reciprocable in said molds and rotating therewith, means to maintain an upright column of asphaltic material above the mold filling position of said molds and to intermittently permit said column to advance by gravity action whereby said molds may be filled by the action of gravity, substantially simultaneously with the retraction of said mold plungers, mold emptying means, means to give said carrier alternate periods of motion and rest whereby said molds may be brought into mold filling, compressing, and emptying positions respectively, and block removing mechanism to remove blocks from said mold carrier; and automatic timing means to time relatively the operation of said compressing instrumentalities and of said coöperating instrumentalities.

21. An automatic, block-forming press comprising in combination a rotatable mold carrier containing a plurality of molds; a plurality of mold plungers; compressing means to give compressive movement to said mold plungers; means to eject the contents of said molds; a sweep arm to remove a block from its ejected position above a mold, said sweep arm operating to remove a block in the arc of a circle and engaging said block on one side and one end thereof; and automatic timing means to time relatively the operation of said ejecting means and of said sweep arm.

22. A press comprising in combination a rotatable mold carrier having a plurality of molds; a plurality of mold plungers; mold carrier operating means to give said carrier alternate periods of motion and rest; a ram to apply pressure to said mold plungers and operating in a chamber containing power transmission liquid; a displacing plunger operating in said chamber and having a smaller relative cross section than said ram for said liquid, said mold carrier operating means and said displacing plunger being automatically timed from a common source but otherwise independently operated.

23. An automatic, block-forming press comprising in combination a rotatable mold table having a plurality of molds; intermittently operating mold table rotating means to progressively present said molds for filling, compressing and emptying; a mold plunger in each mold; a ram to apply pressure to said mold plungers and operating in a chamber constantly filled with a substantially constant body of power transmission liquid; a displacing plunger having a smaller relative cross section than said ram for said liquid; said mold table rotating means and said displacing plunger being automatically timed from a common source but otherwise independently operated.

24. A high speed, high power, automatic asphalt-block-forming, hydraulic press comprising in combination a rotable mold carrier having a plurality of molds; a plurality of mold plungers reciprocable in said molds and rotating therewith; mold carrier operating means to rotate said mold carrier with alternate periods of motion and rest and with increasing and subsequently with decreasing speed in said periods of motion; mold filling means comprising a conduit to maintain a substantially vertical column of gravity controlled asphaltic material in substantial register with a mold when in filling position and means to permit downward movement of said column when a mold is in substantial register with said column during a period of rest of said mold carrier whereby to fill said mold; mold emptying means; a liquid displacing plunger; a reciprocable ram having a greater relative cross section than said displacing plunger to apply pressure to said mold plungers; a receptacle containing a substantially constant body of pressure transmission liquid operatively interposed between said displacing plunger and said ram; and automatic timing means to time relatively the operation of said displacing plunger and of said mold carrier operating means.

25. An automatic, block-forming press comprising in combination a rotatable mold table having a plurality of molds; elastic fluid actuated pressure creating instrumentalities operative to compress material in said molds; single cycle timing means to time the operation of said pressure creating instrumentalities; and multi-cycle means to determine the speed of movement of said molds.

26. A block-forming press comprising in combination a rotatable mold table having a plurality of molds; mold filling means; block ejecting means; pressure creating instrumentalities; single cycle timing means to time the operation of said pressure creating instrumentalities; actuating means to move said mold table; and fractional cycle timing means to time the operation of said block ejecting means.

27. A block-forming press comprising in combination a rotatable mold carrier having a plurality of molds; a plurality of mold plungers reciprocable in said molds, rotating therewith and forming the bottoms thereof; pressure creating means to impart pressure to said mold plungers to compress material in said molds; multi-cycle mold carrier operating means to move said mold carrier; and single cycle timing means to time the periods of effective operation of said multi-cycle mold carrier operating means.

28. A hydraulic press comprising in combination a revolving mold table having a plurality of mold openings, mold plungers reciprocable in said mold openings, forming the bottom surfaces thereof, and rotating with said mold table; a fixed pressure receiving abutment above said mold table; hydraulic compressing means including a displacing plunger, a ram having a greater relative cross section than said displacing plunger, and interposed liquid; and automatic timing means to coördinate the movements of said mold table and said displacing plunger whereby the contents of mold receives its final compression at every stroke of said displacing plunger.

29. A press comprising in combination a rotatable mold carrier having a plurality of molds; a plurality of mold plungers reciprocable in said molds and rotating therewith; shaft timed operating means to give said carrier alternate periods of motion and rest; a single cycle shaft timed fluid pressure actuator to cause compressive movement of said mold plungers; shaft operated mold filling and ejecting means; and a common timing shaft to determine the speed of operation of said press and the relative speed of operation of the timing means for said mold carrier operating means, said ejecting means, and said mold filling means.

In testimony whereof, I have signed my name to this specification, in the presence of two subscribing witnesses.

GEORGE ELI WHITNEY.

Witnesses:
O. S. PLATT,
H. D. WATERHOUSE.